US006753856B1

(12) United States Patent
Krah et al.

(10) Patent No.: US 6,753,856 B1
(45) Date of Patent: Jun. 22, 2004

(54) SYSTEM AND METHOD FOR DYNAMIC CORRECTION OF DISPLAY CHARACTERISTICS

(75) Inventors: Christoph H. Krah, San Jose, CA (US); Richard D. Cappels, Santa Clara, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 10/136,259

(22) Filed: Apr. 30, 2002

Related U.S. Application Data

(63) Continuation of application No. 09/076,664, filed on May 12, 1998.

(51) Int. Cl.[7] .......................... G09G 5/00; G09G 5/10; G06F 12/06

(52) U.S. Cl. ........................ 345/204; 345/572; 345/698

(58) Field of Search ................................ 345/204, 698, 345/572–574

(56) References Cited

U.S. PATENT DOCUMENTS 5,592,240 A * 1/1997 Sakamoto et al. .......... 348/807
5,963,183 A * 10/1999 Takahashi .................. 345/717
6,148,112 A * 11/2000 Chujo ........................ 382/254

* cited by examiner

*Primary Examiner*—Richard Hjerpe
*Assistant Examiner*—Duc Q Dinh
(74) *Attorney, Agent, or Firm*—Nancy R. Simon; Simon & Koerner LLP

(57) ABSTRACT

A system and method for dynamically correcting display characteristics to compensate for non-uniformities is disclosed. In the preferred embodiment, the display screen is divided into logical tiles, and then the initial correction parameters of the characteristics under consideration, namely convergence, brightness, hue, and beamlanding, are measured at the vertices of each tile. The dynamic correction circuitry automatically synchronizes the correction waveforms, which are functions of the locations on the physical display screen, with the control signals of the displayed image. Due to the synchronization, the previously stored initial correction parameters of the characteristics under consideration may be used to dynamically correct for uniformity of these characteristics. The preferred embodiment performs linear vertical and horizontal interpolation on the correction values between the vertices of the tiles.

84 Claims, 24 Drawing Sheets

SYSTEM AND METHOD FOR DYNAMIC CORRECTION OF DISPLAY CHARACTERISTICS

CROSS REFERENCE TO RELATED APPLICATIONS

This application is a continuation of U.S. patent application Ser. No. 09/076,664 filed on May 12, 1998 and entitled "System And Method For Dynamic Correction Of Display Characteristics".

BACKGROUND

1. Field of the Invention

This invention relates generally to display devices, and more particularly to a system and method of dynamically correcting display characteristics.

2. Description of the Background Art

Display devices, including cathode ray tube (CRT) monitors, generally function in a raster configuration. In a raster display, individual picture elements (pixels) of the displayed image are represented by spots illuminated in order from left to right by a horizontal scan which progresses incrementally and vertically down the screen after each horizontal line is finished. In a CRT monitor the spots are small phosphor dots illuminated by a sweeping cathode ray of electrons. One challenge in making and using display devices is keeping characteristics of the display, such as brightness, hue, and convergence, uniform throughout the screen.

Referring now to FIG. 1, a spatial representation of an electron gun and CRT screen is shown. The CRT screen 100 contains a layer of glass 102 coated with a phosphor layer 104. A shadow mask 106 collimates the electron beam 110 emitted by electron gun 112 so that it falls on phosphor layer 104 at those places representing the image color of the respective beam. Typically phosphor layer 104 contains red, green, and blue spots, which may be illuminated by individual electron guns. The electron beam 110 traverses the CRT screen 100 from left to right, as indicated by the arrow, causing the illuminated spot 114 to progress from left to right. However this motion is not visible to the eye because of the eye's response time.

Due to imperfections in manufacturing, phosphor layer 104 is not uniform in thickness or responsiveness throughout the CRT screen 100. Similarly shadow mask 106 is not at a uniform distance from phosphor layer 104. For these and other reasons, spot parameters of the CRT display, such as brightness, hue, convergence, and beam landing, vary throughout the CRT display screen. In order to compensate for this lack of uniformity, the circuits driving the electron guns have traditionally allowed for calibration adjustment by a technician.

Having a calibration technician individually adjust each individual characteristic's uniformity for every monitor manufactured becomes an expensive undertaking. Furthermore, monitors lose their uniformity due to changes in temperature and ambient magnetic fields, and also due to aging, among other factors. Monitors increasingly are used in situations such as aboard aircraft where the environment changes rapidly throughout the day. Therefore, there exists a need for an improved system and method for dynamically correcting the display characteristics requiring only minimal and infrequent calibration by a technician.

SUMMARY

The present invention includes a system and method for dynamically correcting display characteristics to compensate for non-uniformities arising from many causes, including both manufacture and subsequent aging and environmental changes. In the preferred embodiment, the display screen is divided logically into tiles, and then the initial correction parameters of the characteristics under consideration are measured at the vertices of each tile. These initial correction parameters are stored in non-volatile memory for later use by the dynamic correction circuitry.

The dynamic correction circuitry automatically synchronizes the correction waveforms, which are functions of the locations on the physical display screen, with the control signals of the displayed image. The horizontal size is synchronized by an analog phase-locked loop, and the vertical size is synchronized by a line compensation circuit. The position of the image is synchronized by a pair of similarly-designed digital phase-locked loops. Once the correction signals are synchronized with the control signals of the displayed image, there exists a fixed one-to-one correspondence between logical picture elements (pixels) of the displayed image and the correction signal values corresponding to the physical phosphor spots on the display screen.

Due to the one-to-one correspondence between the logical pixels of the displayed image and physical phosphor spots on the display screen, the previously stored initial correction parameters of the characteristics under consideration may be used to dynamically correct for uniformity of these characteristics. The dynamic correction circuitry may use the stored correction parameters, referenced to the vertices of the tiles, to modulate the gain control voltage of the CRT video pre-amplifier, whose signals are referenced to the logical pixels of the displayed image.

The values at one of the vertices of each tile could be used without variation throughout the tile for correction of display characteristics. However this would yield a discontinuous correction function. If applied to the gain control voltages, such a discontinuous correction function would create tile-sized regions with discontinuous display characteristics at the edges of the tiles. Such discontinuities would be both noticeable and objectionable to the viewer of the display. To prevent this, the preferred embodiment of the present invention performs linear vertical and horizontal interpolation on the correction values between the vertices of the tiles.

When the CRT electron beam first enters a tile, the dynamic correction circuitry retrieves the correction values of the four vertices, and then determines the slope of the lines between the correction values at the vertices down the two vertical sides of the tiles. Knowing these slopes, the initial value at the uppermost vertices, and the distance down from the vertices, a linear interpolation value at any point on the two vertical edges of the tiles may be produced. Each time the electron beam enters the tile from the left, the two linear interpolation values at the beam's intersection with the two vertical edges of the tile is determined. Then, using these two interpolated values, the dynamic correction circuitry performs horizontal interpolation along the path of the beam. In this manner, across the complete row of tiles traversed by the electron beam, a continuous linear interpolated display correction function is derived and sent to modulate the gain control of the amplifiers driving the electron guns, or directly to drive the deflection.

DESCRIPTION

The present invention relates to an improvement in correcting display characteristics. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention includes a system and method for dynamically correcting display characteristics to compensate for non-uniformities arising both from manufacture and from subsequent aging and environmental changes. These display characteristics include, but are not limited to, dynamic convergence, brightness, beam landing, and hue.

Figure 1:
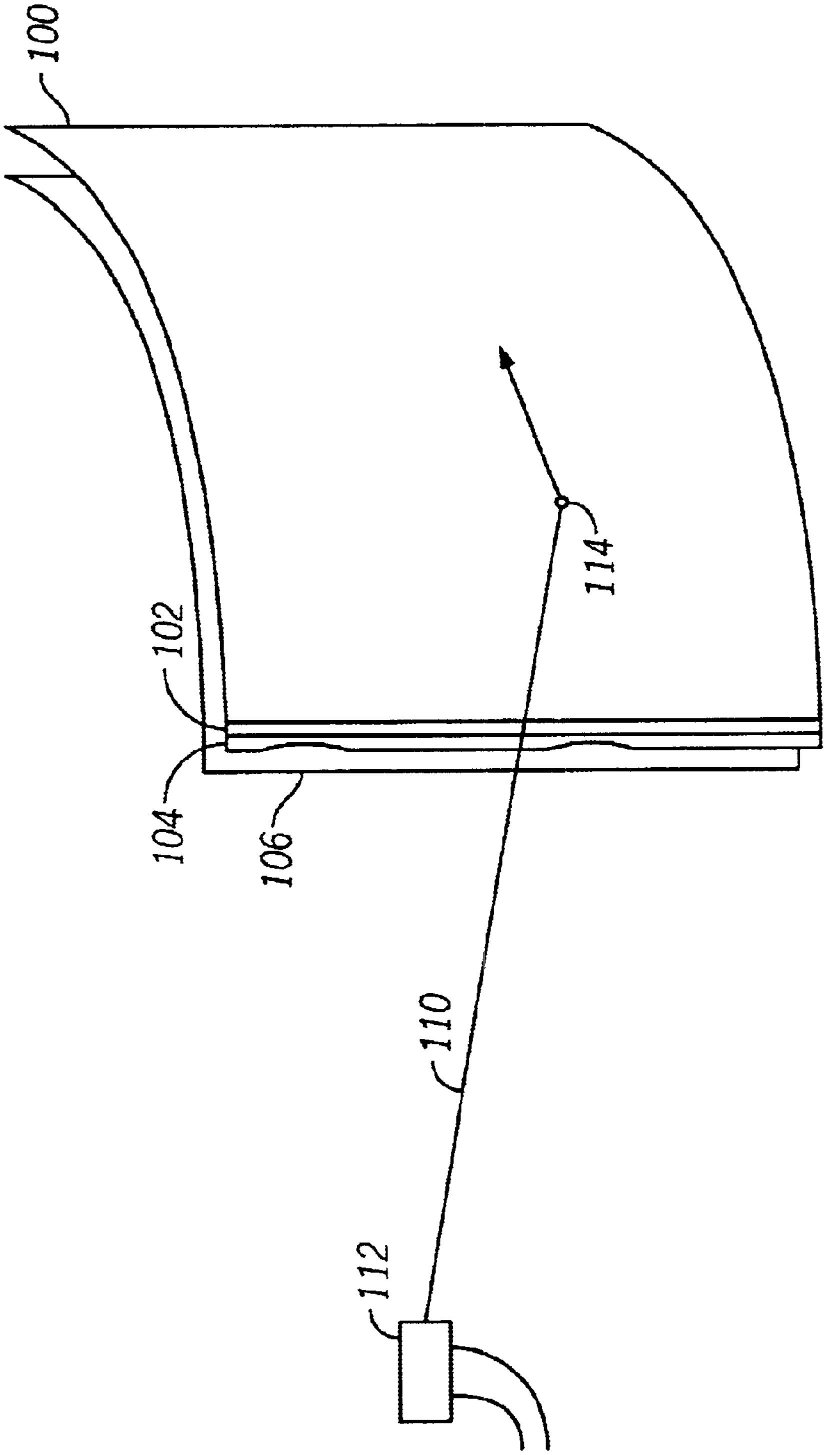
FIG. 1 is a spatial representation of an electron gun and CRT screen.
Figure 2:
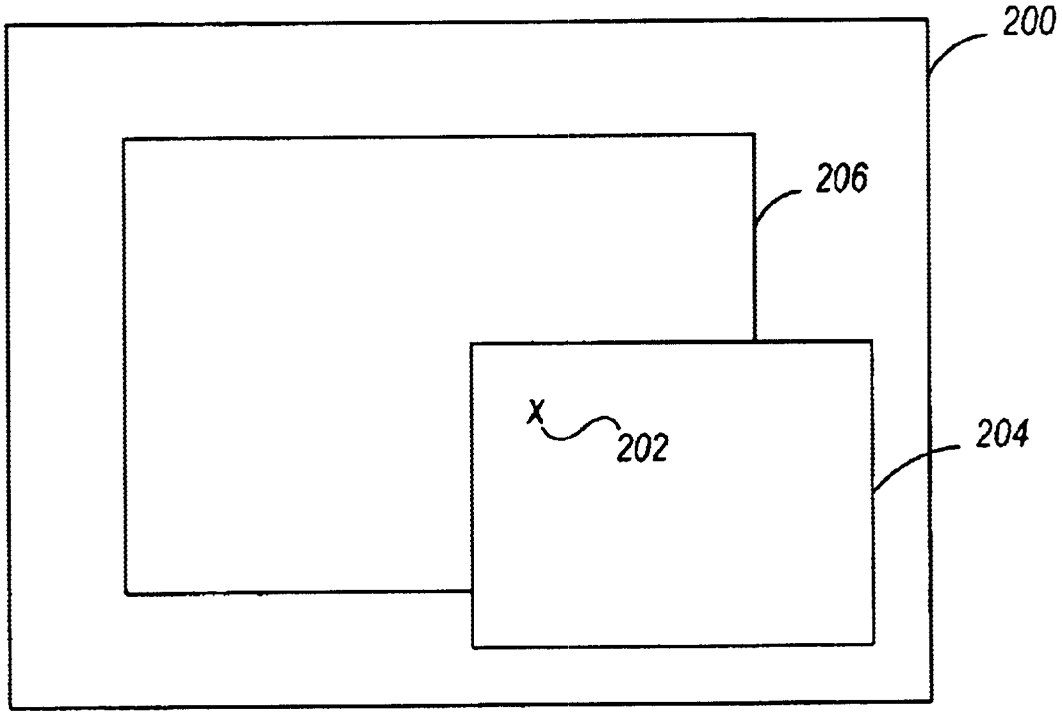
FIG. 2 is a diagram of a particular phosphor spot in relation to the physical bezel.

Referring now to FIG. 2, a diagram of a particular phosphor spot 202 in relation to the physical bezel 200 is shown. The display characteristics such as dynamic convergence, brightness, beam landing, and hue for phosphor spot 202 are generally fixed in regards to the physical bezel 200. However, the image displayed on the physical bezel is not generally fixed on the bezel but rather is dependent on the driver circuits of the display. FIG. 2 shows two representative displayed images 204 and 206. Each representative image 204, 206 is made up of picture elements (pixels). However, the pixels are not in a one-to-one correspondence with specific phosphor dots. Specifically, phosphor spot 202 is illuminated by a pixel in the upper-left corner of representative image 204, but is illuminated by a pixel near the center of representative image 206. The present invention solves this problem by synchronizing the correction signals, whose values are tied to the physical positions on the physical bezel 200, with the pixels created by the driver circuitry no matter the size and position of the displayed image.

Figure 3:
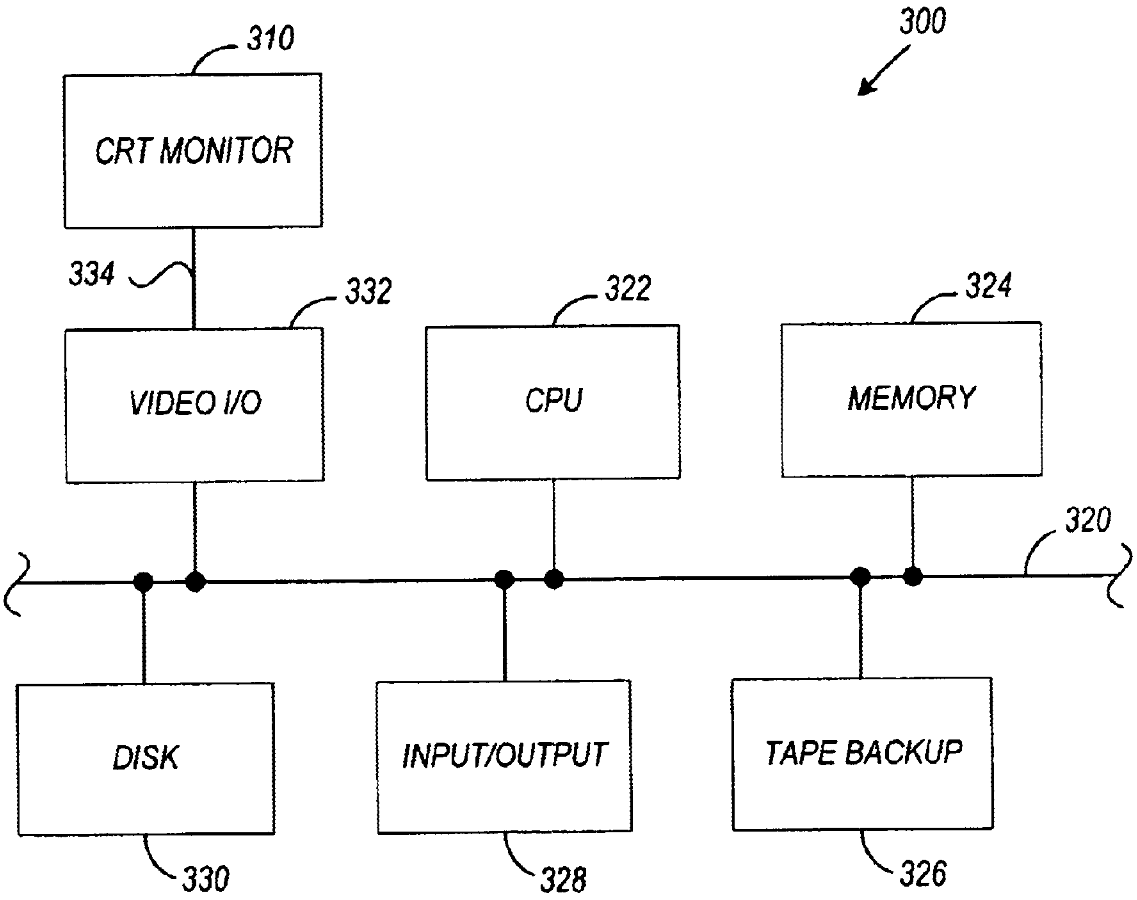
FIG. 3 is a diagram showing a CRT monitor in a computer system.

Referring now to FIG. 3, a diagram showing a cathode-ray tube (CRT) monitor 310 in a computer system 300 is shown. Computer system 300 typically consists of a central bus 320 for communications among the CPU 322, memory 324, tape backup 326, input/output 328, disk 330, and video input/output 332. Video input/output 332 takes digital data and converts it to analog signals, such as industry-standard video signals, for displaying images on CRT monitor 310. In the preferred embodiment of the present invention, video signals on video cabling 334 drive CRT monitor 310. The present invention is discussed in reference to a CRT monitor 310, but the invention is applicable to any pixel-oriented raster-driven display, such as liquid-crystal displays (LCDs), light-emitting diodes (LEDs), or vacuum florescent displays.

Figure 4:
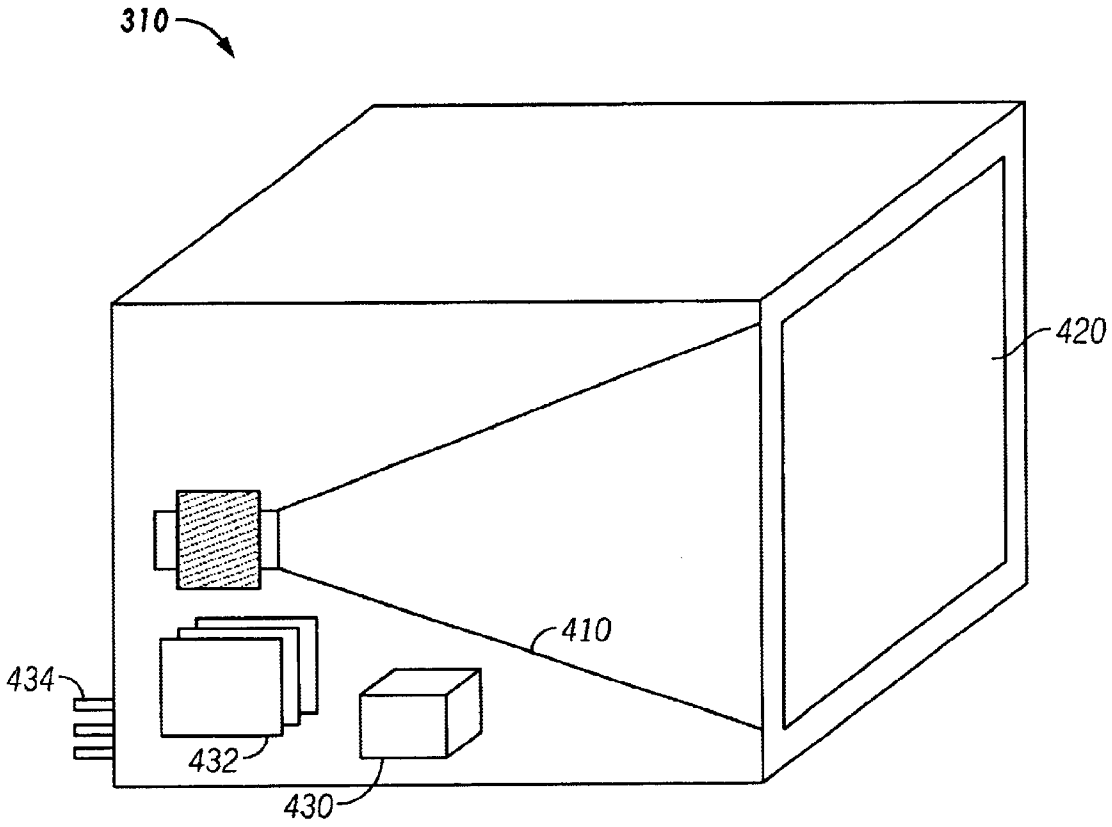
FIG. 4 is an exploded view of a CRT monitor.

Referring now to FIG. 4, an exploded view of a CRT monitor 310 is shown. CRT monitor 310 includes a CRT 410 along with a power supply 430, video driver circuit cards 432, and video connectors 434. The video driver circuit cards 432 receive video signals at video connectors 434 and use these to drive CRT 410, producing an image on the CRT physical bezel 420.

Figure 5:
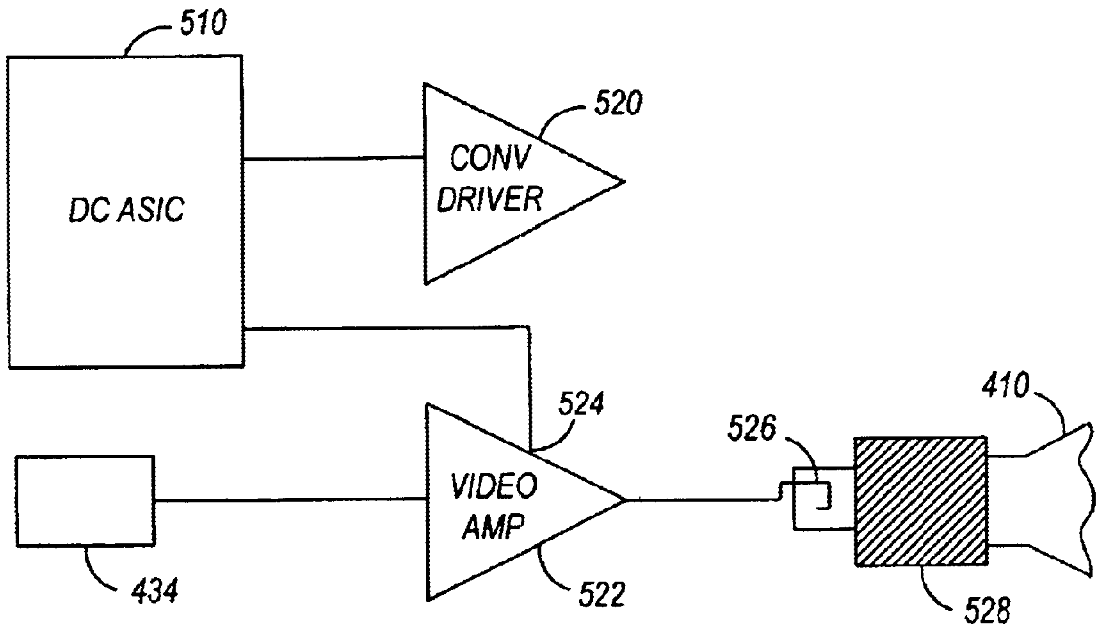
FIG. 5 is a diagram showing the display correction circuit with the CRT drive circuitry, in accordance with the present invention.

Referring now to FIG. 5, a diagram showing the display correction circuit with the CRT drive circuitry is shown, in accordance with the present invention. In the preferred embodiment of the present invention, the display correction circuitry is principally realized in a display-correction application-specific integrated circuit (DC ASIC) 510. The DC ASIC 510 adjusts the various CRT drive elements to promote uniformity of display characteristics throughout the displayed image. For example, in the case of dynamic convergence correction, DC ASIC 510 drives convergence driver 520 which then drives the convergence yoke 528. In the case of dynamic brightness correction, DC ASIC 510 acts upon the gain control input 524 of video amplifier 522. In this way video signals arriving at video connector 434 are amplified with varying gains in video amplifier 522 and thus drive cathode 526 with varying strengths. In this manner brightness is made uniform throughout the image.

Figure 6:
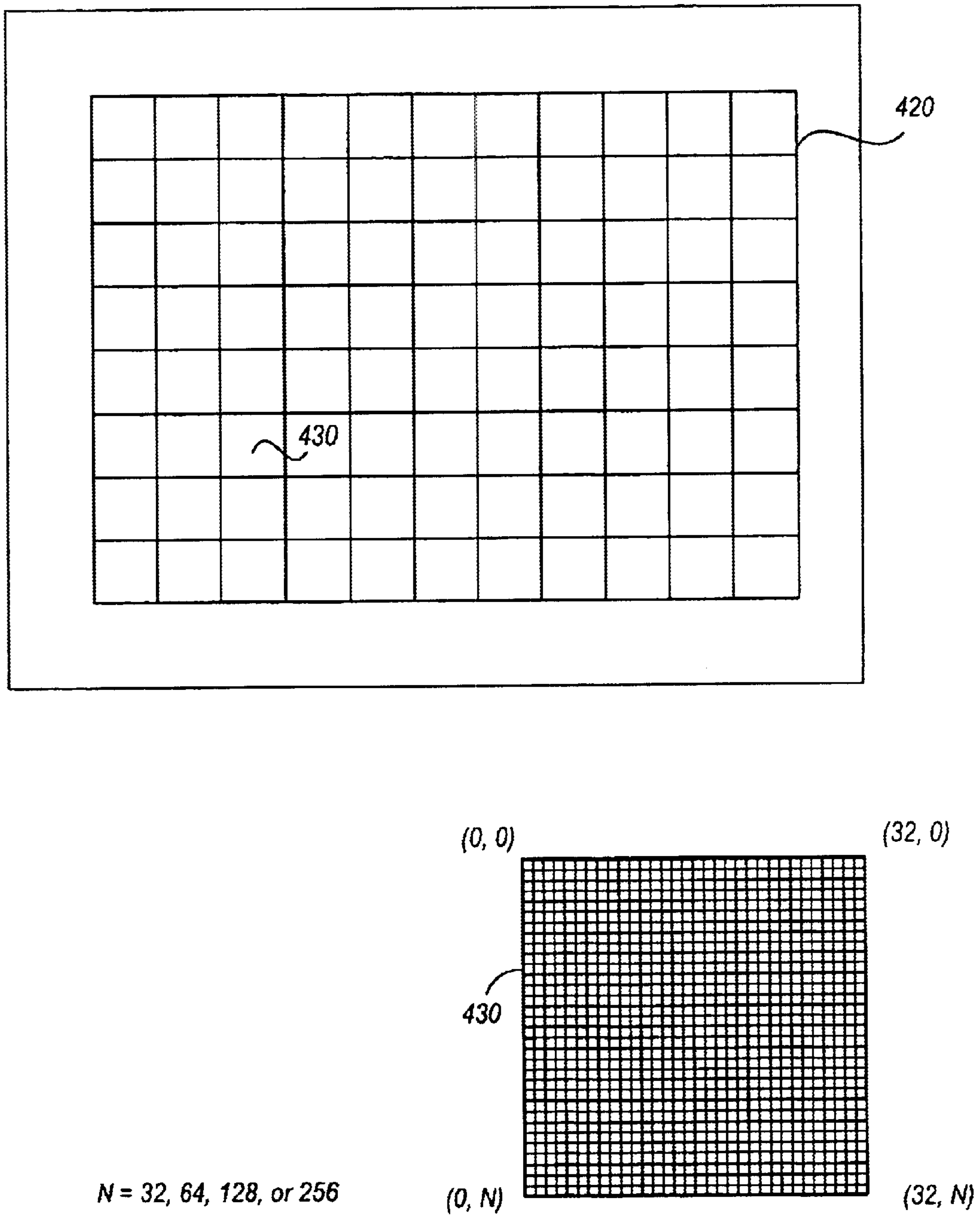
FIG. 6 is a diagram showing the CRT bezel divided into tiles and sub-tiles, in accordance with the present invention.

Referring now to FIG. 6, a diagram showing the CRT bezel 420 divided into tiles and sub-tiles is shown, in accordance with the present invention. These divisions are logical and not physical: there are no marks made upon the bezel 420. The divisions are for geometric reference only. The major subdivisions on CRT bezel 420 are tiles. Each tile, such as representative tile 430, is further subdivided into a number of sub-tiles. The number of tiles and sub-tiles is arbitrary, but careful selection may aid in the implementation of the DC ASIC 510. In the preferred embodiment of the present invention, the CRT bezel 420 is divided into 8 rows and 11 columns of tiles on bezel 420. Each tile defines 4 vertices at the corners of the tiles. Because the traditional raster scan goes from left to right across the screen and progresses downward from top to bottom, it is convenient to label the vertices from the upper left corner of the screen, starting at (0, 0).

Each tile is further divided into sub-tiles. In the preferred embodiment of the present invention, the number of sub-tiles is a power of 2, allowing for easy manipulation of data by shifting in a shift register. The number of horizontal sub-tiles is set at 32: the number of vertical sub-tiles may be either 32, 64, 128, or 256 depending upon the number of vertical scan lines displayed at any given time. As shown in FIG. 6, the sub-tiles are numbered by coordinates from the upper left corner of the corresponding tile.

The vertices of the tiles function as convenient places to measure the display characteristics during initial manufacture. The alignment technician may measure the various display characteristics' values at the vertices, using some kind of alignment template. These values may then be stored in nonvolatile memory for future use in correcting the display characteristics. While it is technically feasible to measure the display characteristics at each point on the screen, the present invention uses interpolated values of the display characteristics at those points between tile vertices. This has the advantages of drastically reducing the number of points where measurements are taken, and also reducing the memory required to store the measured values.

Figure 7:
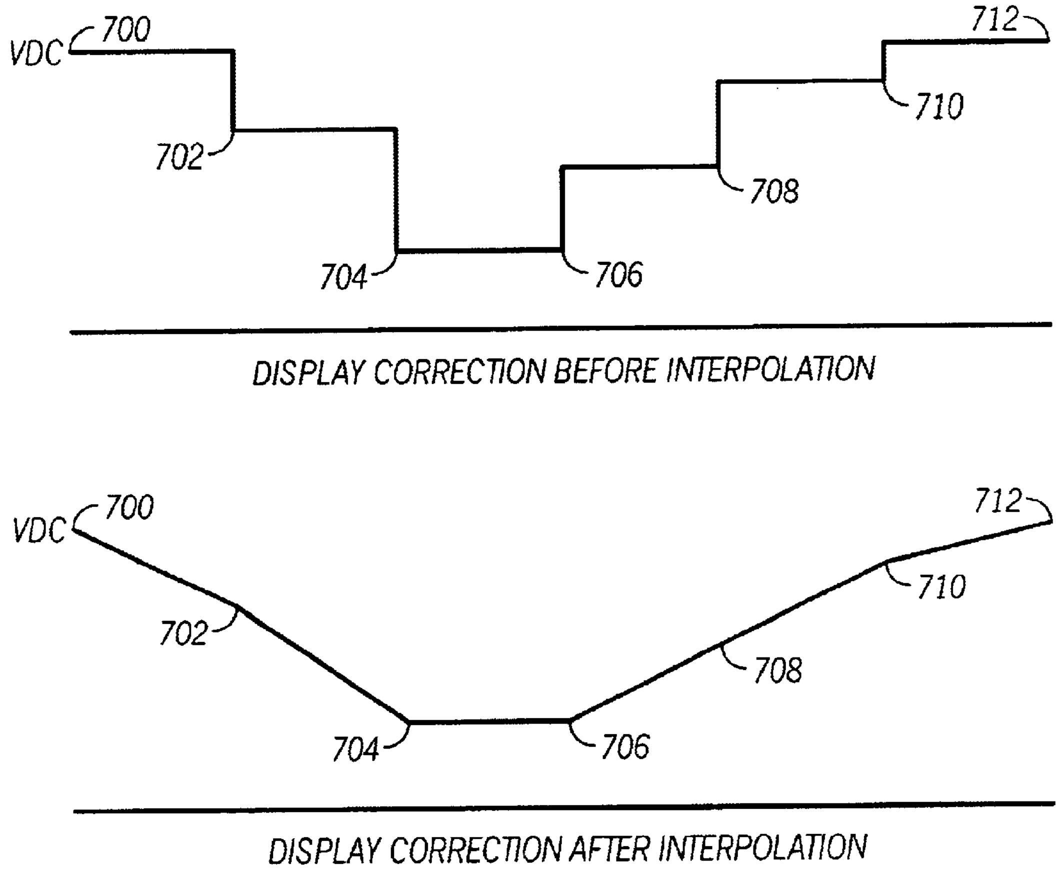
FIG. 7 is a waveform diagram showing the effects of interpolation, in accordance with the present invention.

Referring now to FIG. 7, a waveform diagram showing the effects of interpolation is shown, in accordance with the present invention. The display correction voltage VDC is plotted against the horizontal distance between representative tile vertices 700 through 712. The first graph of FIG. 7 shows the effects if VDC were held constant throughout a tile. In this case there would be sharp discontinuities at the tile boundaries. Such discontinuities would be both noticeable and objectionable to the viewer of the CRT display. For this reason some kind of interpolation between vertices is beneficial.

The simplest kind of interpolation is linear interpolation. A line is drawn between the values of VDC at the vertices and this line determines the values of VDC between the vertices. The second graph of FIG. 7 shows the effects of linear interpolation of the VDC values between tile vertices. The linear interpolation has eliminated the discontinuities at the tile boundaries. In practice the linear interpolation produces a display where the changes in direction of the linear segments is not noticeable to the viewer of the CRT display.

Figure 8:
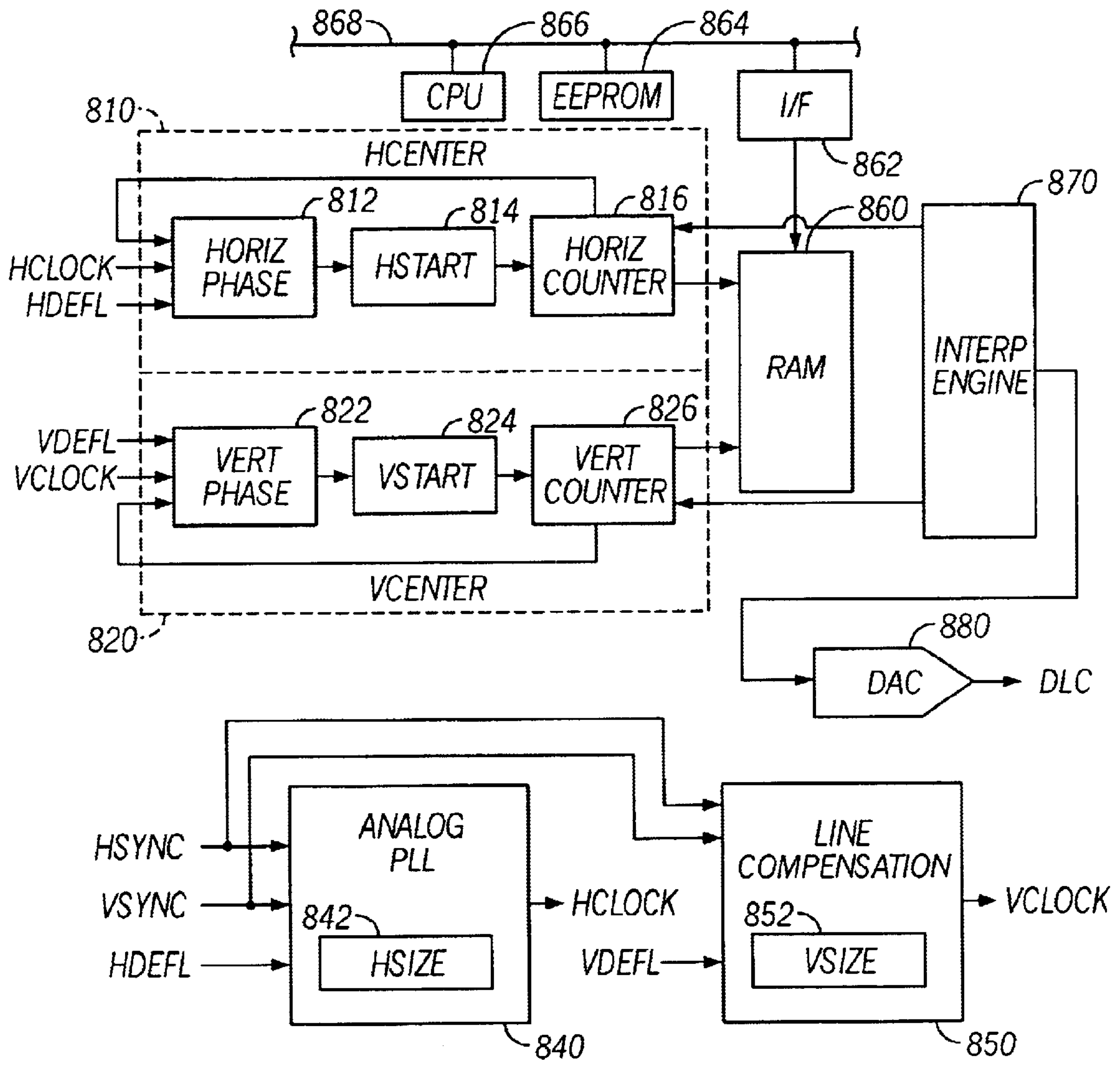
FIG. 8 is an overall block diagram of a single-channel display correction circuit, in accordance with the present invention.

Referring now to FIG. 8, an overall block diagram of a single-channel display correction circuit is shown, in accordance with the present invention. Here the term single-channel refers to the circuit controlling a single spot display characteristic, such as hue or convergence. The circuit of FIG. 8 has a correction signal synchronizer which synchronizes the timing of the correction signals, whose amplitudes correspond to the display correction signals measured with respect to the physical bezel, to the displayed image no matter the horizontal and vertical size and position of the displayed image. These horizontal and vertical size and position synchronizers ensure a one-to-one correspondence between the correction signals applied to the pixels created by the driver circuits and the phosphor spots on the physical bezel. Once the one-to-one correspondence is established, the digital values of the correction voltages stored during manufacturing may be accessed and used with linear interpolation to yield display correction voltages everywhere on the CRT bezel.

In FIG. 8, an analog phase-locked loop (PLL) 840 synchronizes the correction signals to the horizontal size of the displayed image and a line compensation circuit 850 synchronizes the correction signals to the vertical size of the displayed image. Each contains a digital register for storing a size-control digital data word: analog PLL 840 contains HSIZE register 842 and line compensation circuit 850 contains VSIZE register 852. The operation of analog PLL 840 is described in detail in the discussion of FIG. 15 below. The operation of the line compensation circuit 850 is described in detail in the discussion of FIGS. 13 and 14 below.

The outputs of analog PLL 840 and line compensation circuit 850 are basic clock signals HCLOCK and VCLOCK, respectively. These clock signals drive the horizontal digital PLL 810 and vertical digital PLL 820, respectively. The horizontal digital PLL 810 and vertical digital PLL 820 operate the same way, so the following description of horizontal digital PLL 810 will also be applicable to vertical digital PLL 820. Horizontal digital PLL 810 operates by comparing the relative timing of HDEFL, a pulse derived from the horizontal deflection signal and thresholds, and HCENTER, a pulse derived by counting HCLOCK signals. In the preferred embodiment of the present invention, HDEFL corresponds to the time during which the analog horizontal deflection signal Uhd causes the beam to traverse the 5 center horizontal tiles (out of 11), and HCENTER should correspond to the same time. The two pulses are locked together by adjusting the data value in HSTART register 814, which is related to the number of HCLOCK pulses before HCENTER goes positive. In this way the digital position representation with tiles and sub-tiles is locked to the position generated by the analog deflection signal.

RAM 860, interpolation engine 870, and DAC 880 together form a correction generator which generates correction signals for the image based upon correction voltages measured with respect to the CRT display. The digital values of the spot display characteristic correction voltages stored during manufacturing are initially stored in non-volatile memory such as EEPROM 864, and are downloaded into RAM 860 via interface 862 under the control of CPU 866. In the preferred embodiment provisions are made for the CRT monitor's user to perform a re-calibration and store the updated correction voltages in EEPROM 864. As the horizontal counter 816 and vertical counter 826 contain digital location values of which tile the electron beam is currently scanning over, they may drive the address lines of RAM 860 and deposit the digital values of the correction values into linear interpolation engine 870. The digital output of interpolation engine 870 drives digital-to-analog converter (DAC) 880, generating the analog spot display characteristic correction voltages.

Figure 9:
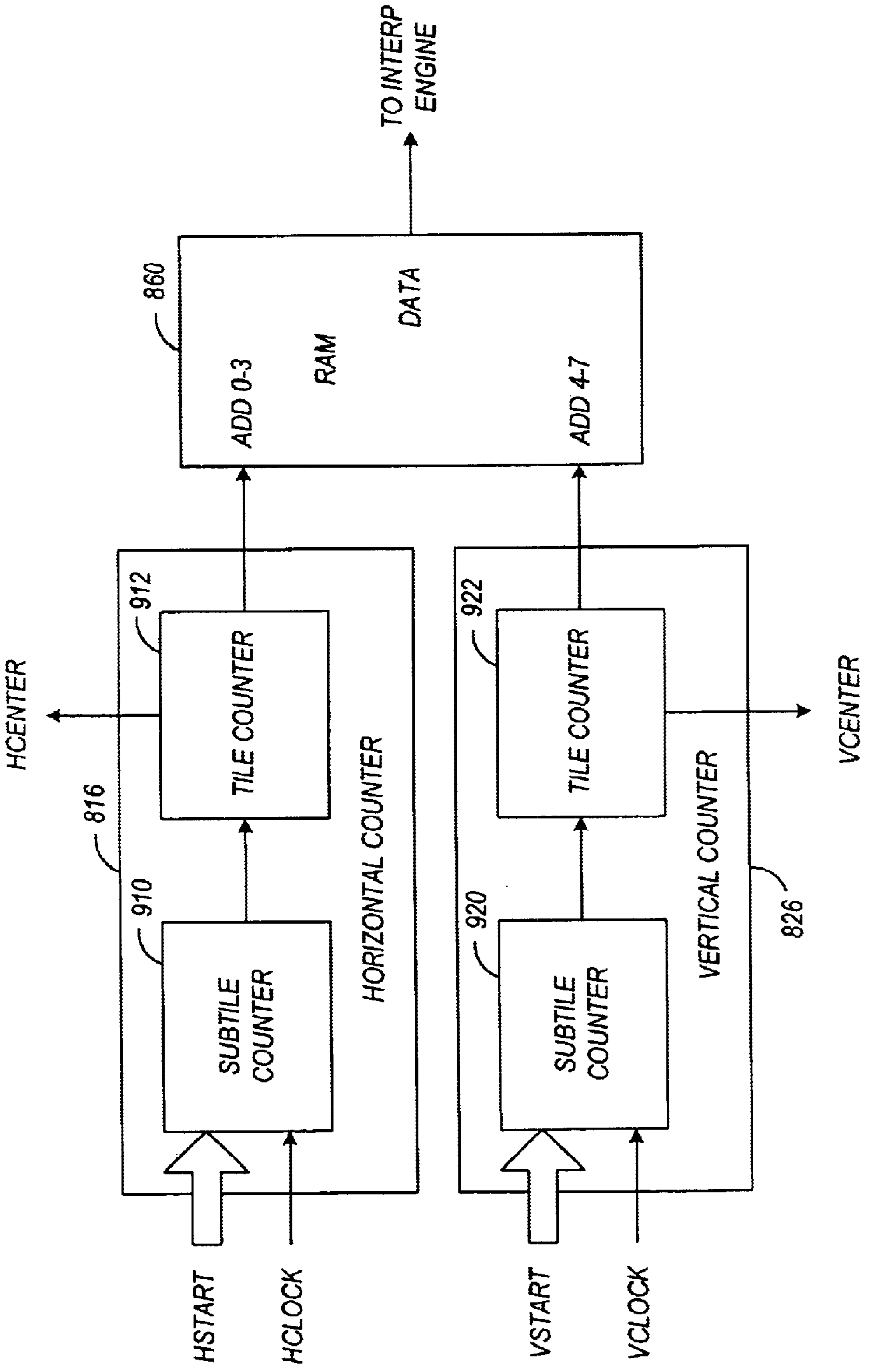
FIG. 9 is a detailed block diagram of the digital phase-locked loops of FIG. 8, in accordance with the present invention.

Referring now to FIG. 9, a detailed block diagram of the counters 816, 826 of the digital phase-locked loops of FIG. 8 is shown, in accordance with the present invention. Each counter 816, 826 has a subtile counter which counts the clock signals HCLOCK and VCLOCK, respectively. At the beginning of each horizontal scan line, the initial position digital value HSTART is preloaded into the horizontal subtile counter 910. The horizontal subtile counter 910 counts up until it reaches the maximum subtile count per tile, which in the preferred embodiment is 32. At this point the horizontal subtile counter 910 rolls over to 0, corresponding to the electron beam entering the next tile. As the horizontal subtile counter 910 rolls over it sends a clock pulse to horizontal tile counter 912. In this manner the value in horizontal tile counter 912 tracks the tile over which the electron beam is currently scanning. This value is used for two purposes. The HCENTER pulse is decoded from the value in the horizontal tile counter 912, which in the preferred embodiment makes HCENTER positive during tiles 4 through 8. The value in the horizontal tile counter also directly drives the least significant bits of the address of RAM 860, thus retrieving the digital values of the correction voltages stored in RAM 860 corresponding to the current tile position. The vertical subtile counter 920 and vertical tile counter 922 operate in a similar manner, generating the VCENTER signal and driving the most significant bits of the address of RAM 860.

Figure 10:
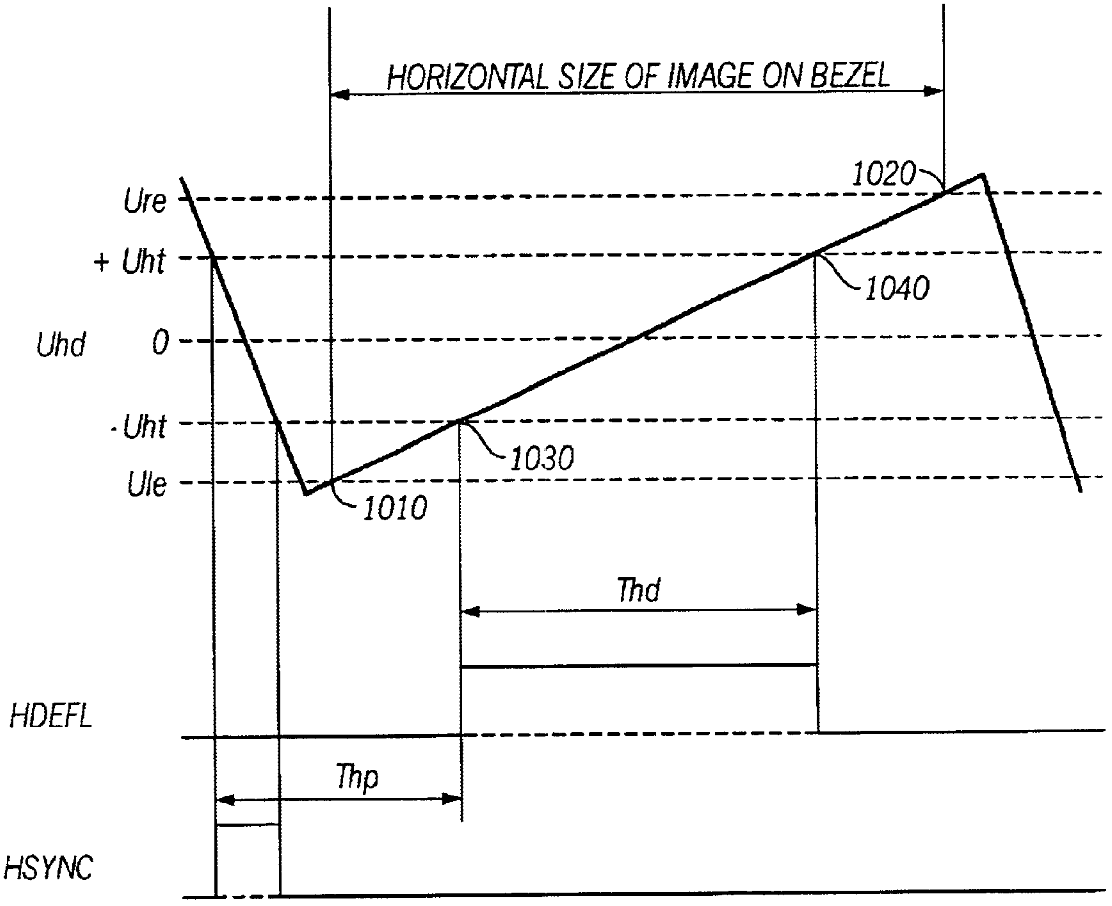
FIG. 10 is a waveform diagram showing the derivation of digital pulses, in accordance with the present invention.

Referring now to FIG. 10, a waveform diagram showing the derivation of digital pulses is shown, in accordance with the present invention. The electron beam is guided by the analog horizontal deflection signal Uhd, which is a repeated sawtooth waveform. The point 1010 at which Uhd traverses threshold value Ule during Uhd's upward slope corresponds to the electron beam being at the left edge of the CRT bezel: the point 1020 at which Uhd traverses threshold value Ure during Uhd's upward slope corresponds to the electron beam being at the right edge of the CRT bezel. This defines the horizontal size of the image on the CRT bezel. In the preferred embodiment of the present invention, the HDEFL pulse is derived by comparing the rising Uhd with selected threshold voltages +Uht (point 1040) and −Uht (point 1030). This generates a digital pulse corresponding to the center of the image on the bezel. In contrast, HSYNC is a pulse generated externally to the CRT monitor 310 by video I/O 332. The time between the rise of HSYNC and the rise of HDEFL is called Thp, and the number of HCLOCK signals counted during this period should be HSTART. The corresponding vertical signal VDEFL is derived from the analog vertical deflection signal Uvd in a similar manner, with VSYNC derived again externally by video I/O 332.

Figure 11:
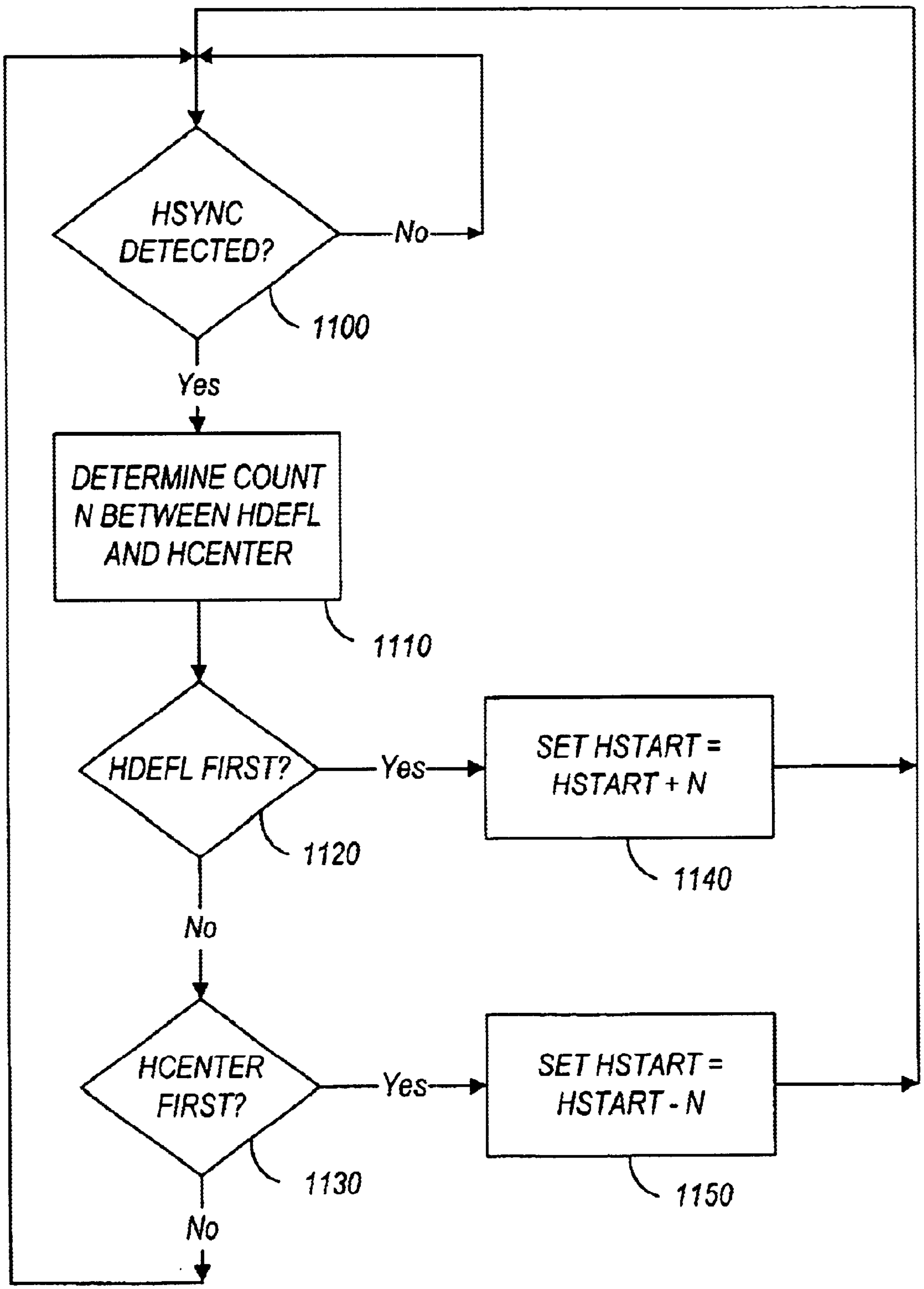
FIG. 11 is a flowchart showing the process used by the horizontal centering phase-locked loop of FIG. 9, in accordance with the present invention.

Referring now to FIG. 11, a flowchart of the process used by the horizontal centering phase-locked loop of FIG. 9 is shown, in accordance with the present invention. This process occurs in the horizontal phase circuit 812. In step 1100, the circuit waits until the rising edge of HSYNC is detected. Then, in step 1110, a counter counts the number N of HCLOCK pulses between the rising edges of HDEFL and HCENTER. If, in step 1120, the HDEFL rising edge occurs first, then in step 1140 the digital value HSTART in the HSTART register 814 is replaced with HSTART +N. Conversely, if, in step 1130, the HCENTER rising edge occurs first, then in step 1150 the digital value HSTART in the HSTART register 814 is replaced with HSTART −N. Finally, if, in step 1130, neither rising edge occurs first, the signals are locked and no adjustment to HSTART is necessary. A similar process takes place in the vertical phase circuit 822, where the relative positions of the rise times of VDEFL and VCENTER are used to adjust the digital value VSTART.

Figure 12:
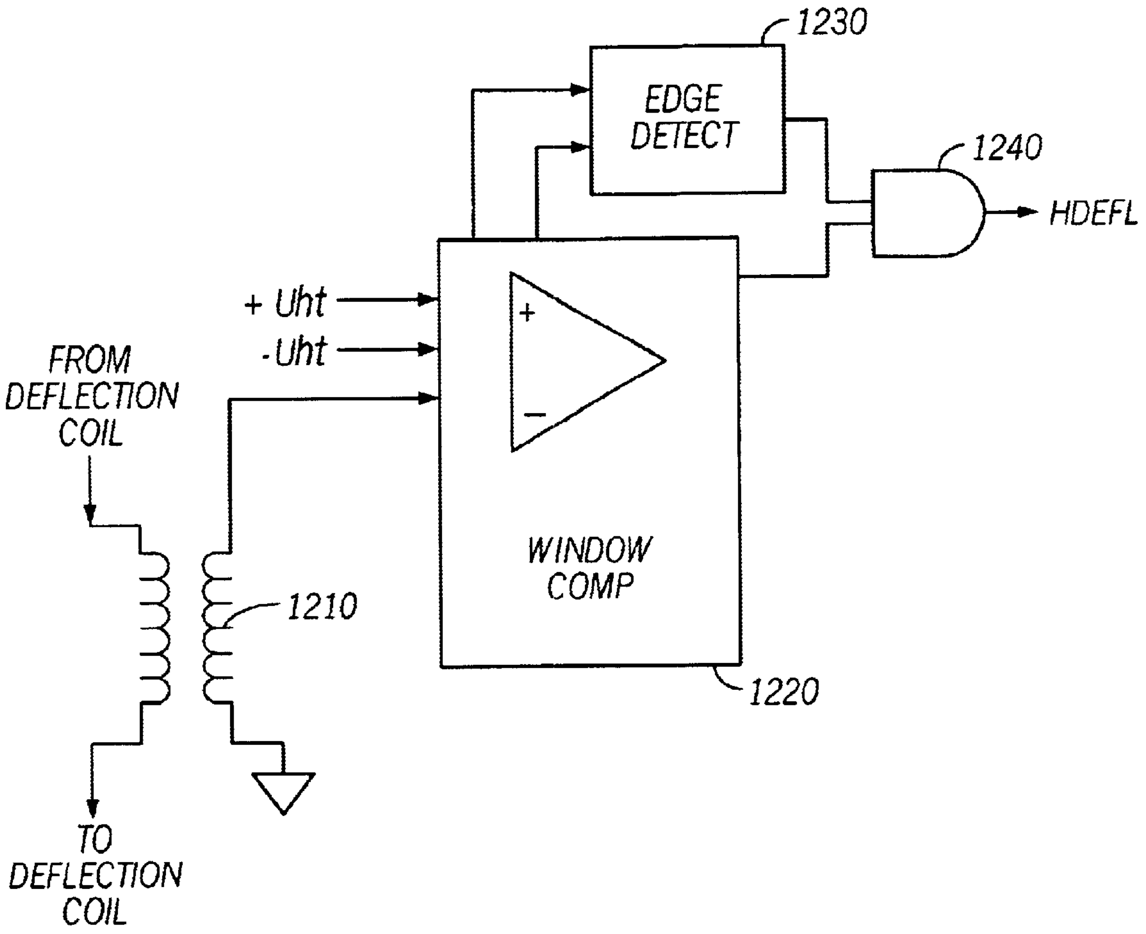
FIG. 12 is a schematic diagram of the circuit implementing the derivation of digital pulses of FIG. 10, in accordance with the present invention.

Referring now to FIG. 12, a schematic diagram of the circuit implementing a the derivation of digital pulses of FIG. 10 is shown, in accordance with the present invention. The analog horizontal deflection signal is tapped with current transformer 1210 to form signal Uhd. This tapped signal Uhd is presented to the window comparator circuit 1220, which utilizes threshold values +Uht and −Uht. The window comparator circuit 1220 detects when Uhd is between the two thresholds, but this will yield two pulses: one during the positive slope of Uhd (HDEFL) and one during the negative slope of Uhd. An edge detector circuit 1230 determines the slope of Uhd, and the output of edge detector circuit 1230 is used to gate the output of window comparator in gate 1240 to select HDEFL. A similar circuit is used to derive VDEFL from the analog vertical deflection signal.

Figure 13:
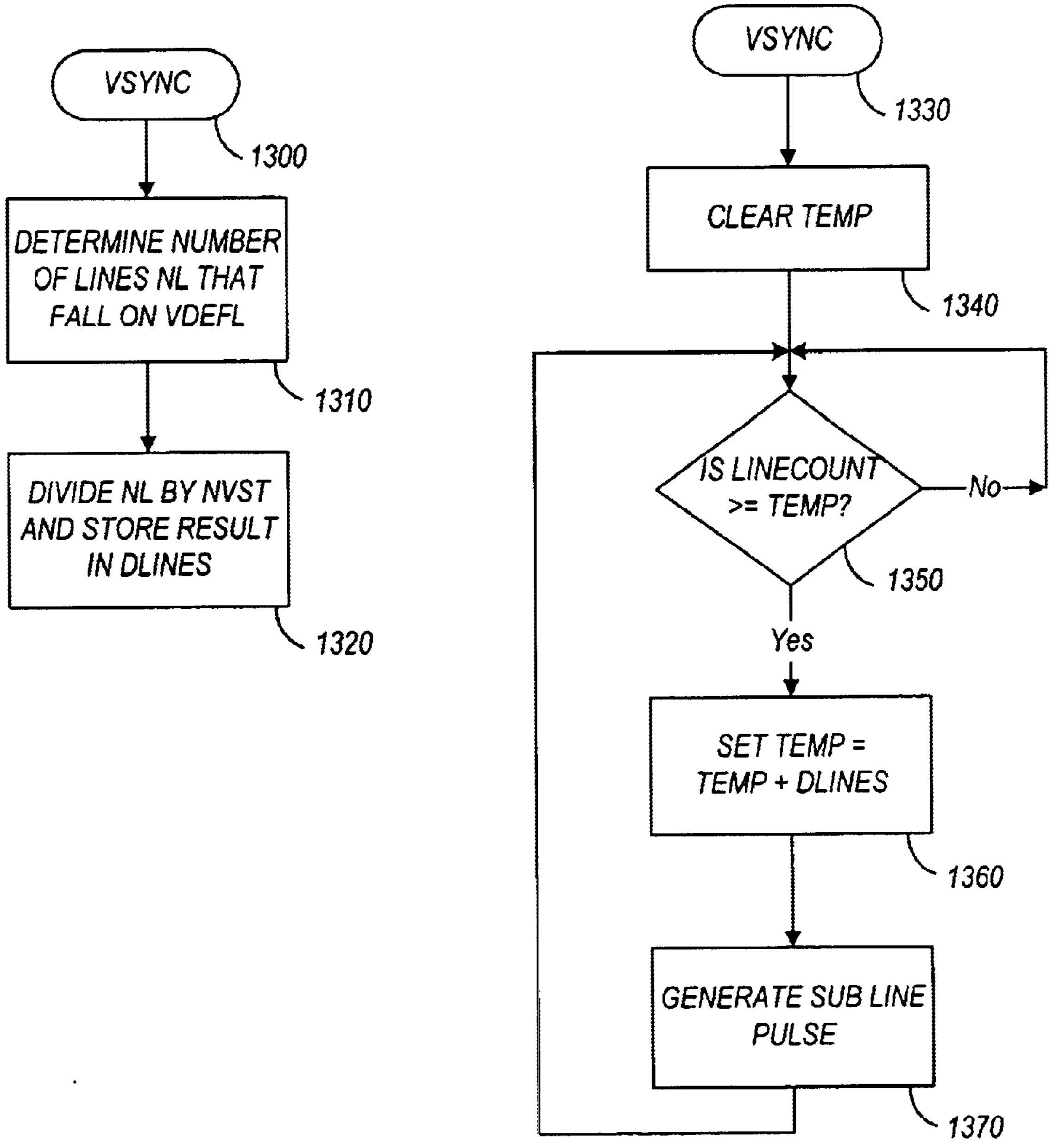
FIG. 13 is flowchart showing the process used by the vertical line compensation circuit of FIG. 8, in accordance with the present invention.

Referring now to FIG. 13, a flowchart showing the process used by the vertical line compensation circuit 850 of FIG. 8 is shown, in accordance with the present invention. The vertical line compensation circuit 850 generates a constant number of clock pulses per frame. These clock pulses are called sub-lines, and the rate at which they occur is called the vertical frequency. The sub-lines are synchronized with HSYNC to prevent their changing during a horizontal scan. The number of sub-lines per frame is proportional to the number of vertical sub tiles (NVST) which occur within VDEFL. In the first part of FIG. 13, after a VSYNC pulse is received in step 1300, the line compensation circuit 850 determines, in step 1310, the number of scan lines NL which occur during the period when VDEFL is positive. Then in step 1320 the value of NL is divided by NVST, and the resulting quotient is stored in the DLINES register. The division is simplified by the choice of a power of two as the number of vertical sub-tiles, allowing division by shifting.

Once DLINES has been determined, upon subsequent VSYNC pulses at step 1330, the TEMP register is cleared in step 1340. Then in step 1350, whenever the current scan line count, LINECOUNT, exceeds the value in TEMP, then in step 1360 the current value in TEMP is replaced by TEMP+DLINES. TEMP therefore always contains a multiple of DLINES. After each addition of DLINES to TEMP, in step 1370, a new sub-line pulse is generated as part of VCLOCK.

Figure 14:
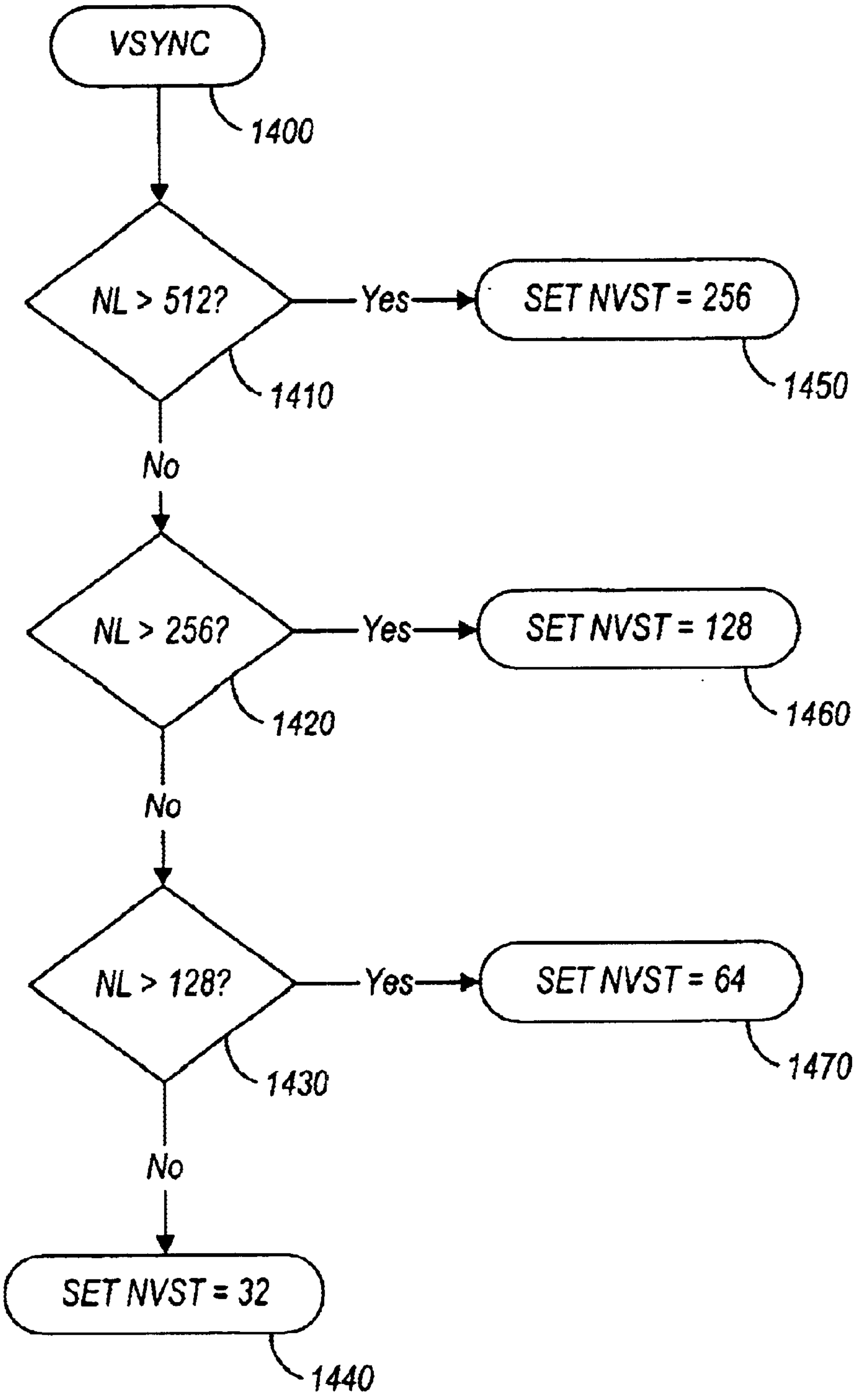
FIG. 14 is a flowchart showing the dynamic vertical sub tile selection performed in the line compensation circuit of FIG. 8, in accordance with the present invention.

Referring now to FIG. 14, a flowchart showing the dynamic vertical subtile selection performed in the line compensation circuit 850 of FIG. 8 is shown, in accordance with the present invention. Because the number of vertical scan lines may vary in multisync monitor applications, the line compensation circuit 850 dynamically varies the number of vertical sub-tiles per vertical tile. In the preferred embodiment of the present invention, the number of sub-tiles will be a power of 2. The dynamic vertical subtile circuit selects the number of vertical sub-tiles per tile to ensure that DLINES is a number between 1 and 2. In step 1400, the process begins on receipt of VSYNC. Then in steps 1410, 1420, and 1430 the size of NL is compared with powers of 2 range values. Depending on the size of NL, in steps 1440, 1450, 1460 and 1470 the value of NSVT is set to the next lowest power of 2, ensuring that DLINES will be between 1 and 2.

Figure 15:
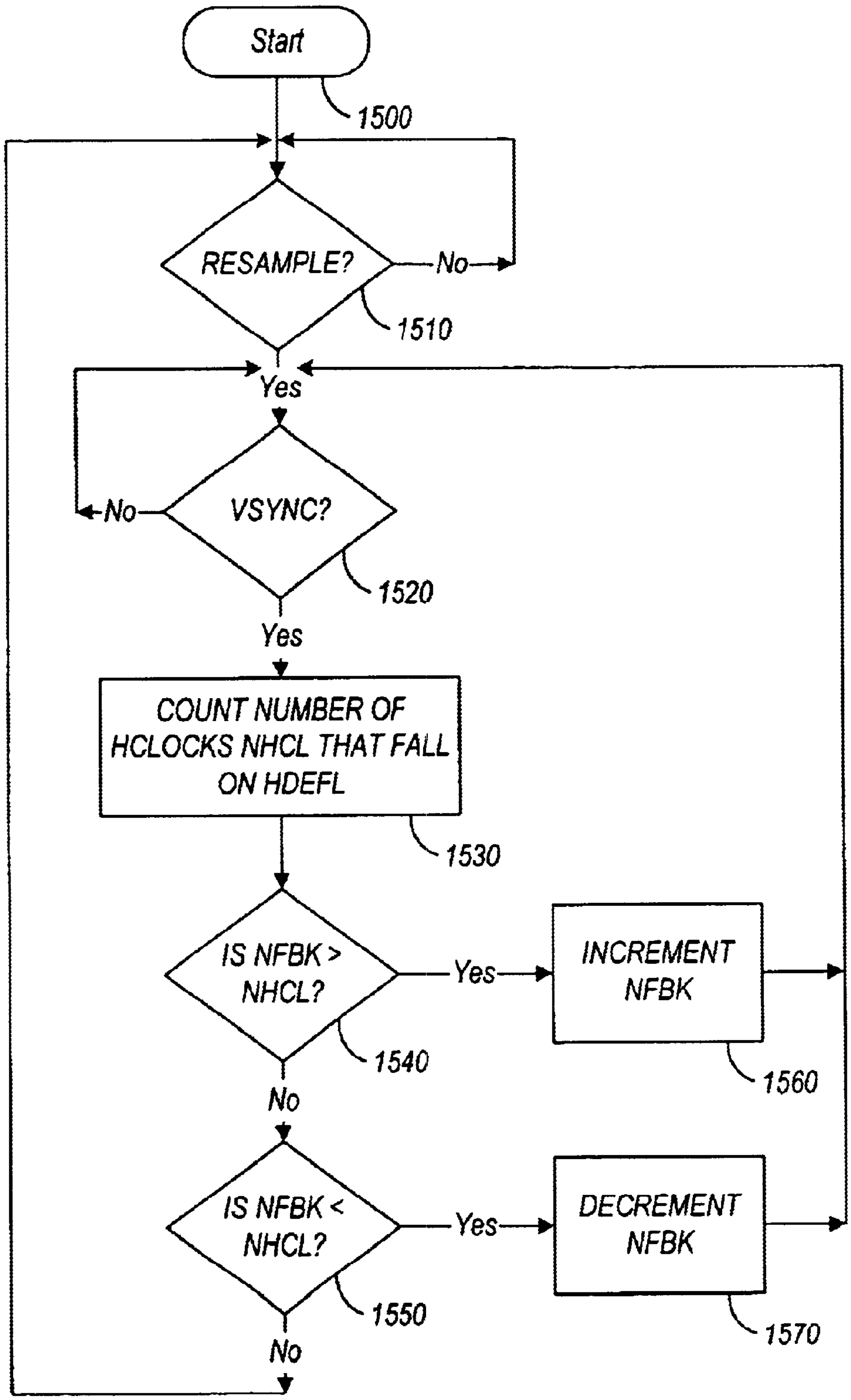
FIG. 15 is a flowchart showing the dynamic horizontal size adjustment performed in the analog phase-locked loop of FIG. 8, in accordance with the present invention.

Referring now to FIG. 15, a flowchart showing the dynamic horizontal size adjustment performed in the analog PLL 840 of FIG. 8 is shown, in accordance with the present invention. Analog PLL 840 makes use of a frequency-multiplier configuration to generate HCLOCK. The analog PLL 840 determines a value referred to as numeric feedback (NFBK) so that if the input frequency to the analog PLL 840 is f, the output frequency is (NFBK)(f). Since in the preferred embodiment the HDEFL pulse should occur during the middle 5 horizontal tiles, and the tiles have 32 sub-tiles, the HDEFL pulse should be 160 sub-tiles wide. To put the HCLOCK signal in sync with the sub-tiles, there should therefore be 160 pulses in HCLOCK during the HDEFL pulse. After power on, in step 1500, the analog PLL 840 makes periodic samples, once per frame, to ensure the correct frequency of HCLOCK. When a resample is initiated, in step 1510, the PLL waits for a VSYNC pulse, in step 1520. After a VSYNC pulse is detected, then in step 1530 the analog PLL 840 counts the number of HCLOCK pulses, NHCL, which occur during the HDEFL pulse. Then in step 1540, if NFBK is greater than NHCL, then in step 1560 the value of NFBK is incremented by 1. If not, then in step 1550, if NFBK is less than NHCL, then in step 1470 the value of NFBK is decremented by 1. If, in step 1550 NFBK is not less than NHCL it must therefore equal NHCL. Therefore HCLOCK is locked with the sub-tiles.

Figure 16:
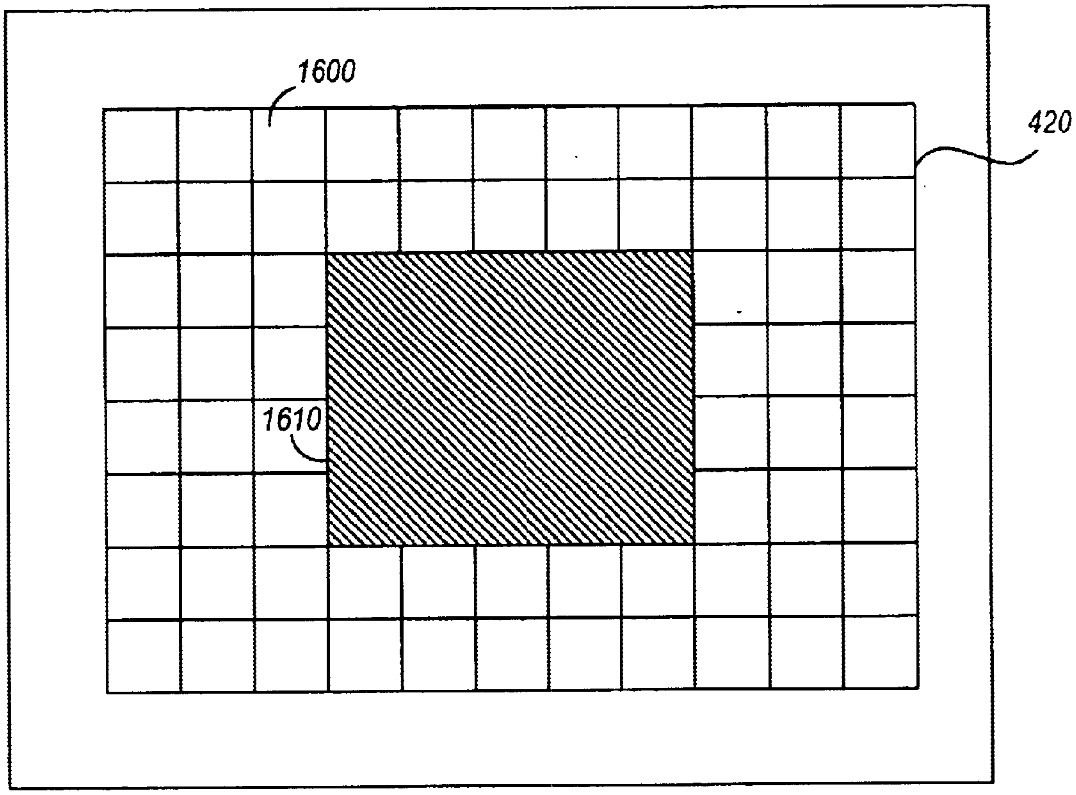
FIG. 16 is a physical drawing of the CRT bezel showing the tiles covered by the calibration signal, in accordance with the present invention.

Referring now to FIG. 16, a physical drawing of the CRT bezel showing the tiles covered by the calibration signal is shown, in accordance with the present invention. The calibration signal is used during manufacturing calibration to initially set the threshold voltages +Uht, −Uht, +Uvt, and −Uvt used in the determination of HDEFL and VDEFL. During calibration, an overlay 1600 displaying a tile grid is placed over CRT bezel 420. A video signal whose image 1610 should represent a lighted area 5 horizontal tiles wide and 4 vertical tile high, centered in the CRT bezel 420, is applied. The threshold voltages +Uht, −Uht, +Uvt, and −Uvt are then adjusted until the displayed image 1610 is aligned with the corresponding tiles on overlay 1600. Threshold voltages +Uht, −Uht, +Uvt, and −Uvt may be set using analog potentiometers, but in the preferred embodiment are stored as digital values which drive DACs in order to achieve better voltage stability.

Figure 17:
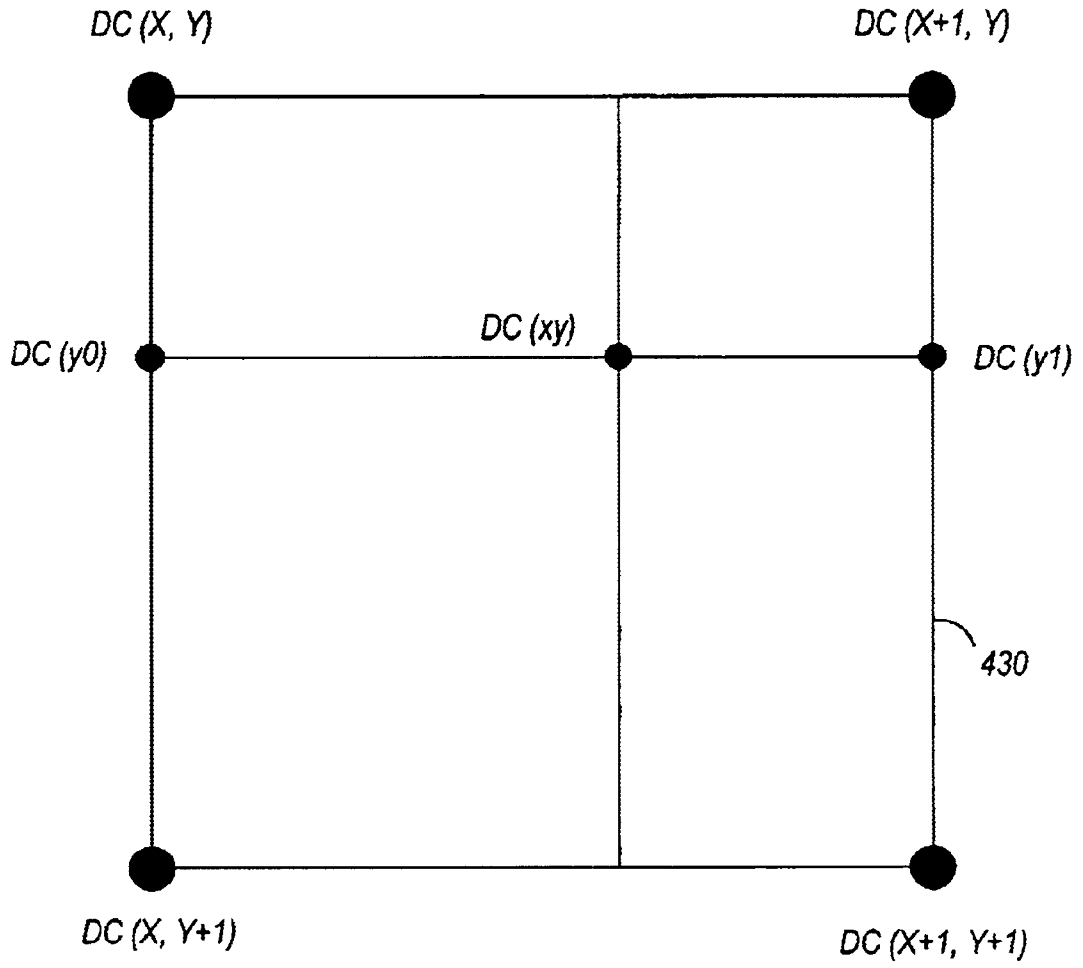
FIG. 17 is a diagram showing linear interpolation on a tile, in accordance with the present invention.

Referring now to FIG. 17, a diagram showing linear interpolation on a tile is shown, in accordance with the present invention. Let display correction (DC) represent the correction function to one of several display characteristics such as beam landing or brightness. FIG. 17 shows a representative tile 430 on CRT bezel 420. During initial calibration the values of DC at the 4 vertices of representative tile 430 were measured and stored. When the electron beam will sweep across tile 430, the values of DC at the 4 vertices are retrieved and linearly interpolated throughout the tile 430. First the interpolation engine 870 must vertically linearly interpolate down the two vertical sides of the tile 430 to create intermediate values DC(y0) and DC(y1). Then during each sweep the interpolation engine 870 must horizontally interpolate between DC(y0) and DC(y1) to create the interpolated value DC(xy) at the subtile currently illuminated by the electron beam.

Figure 18:
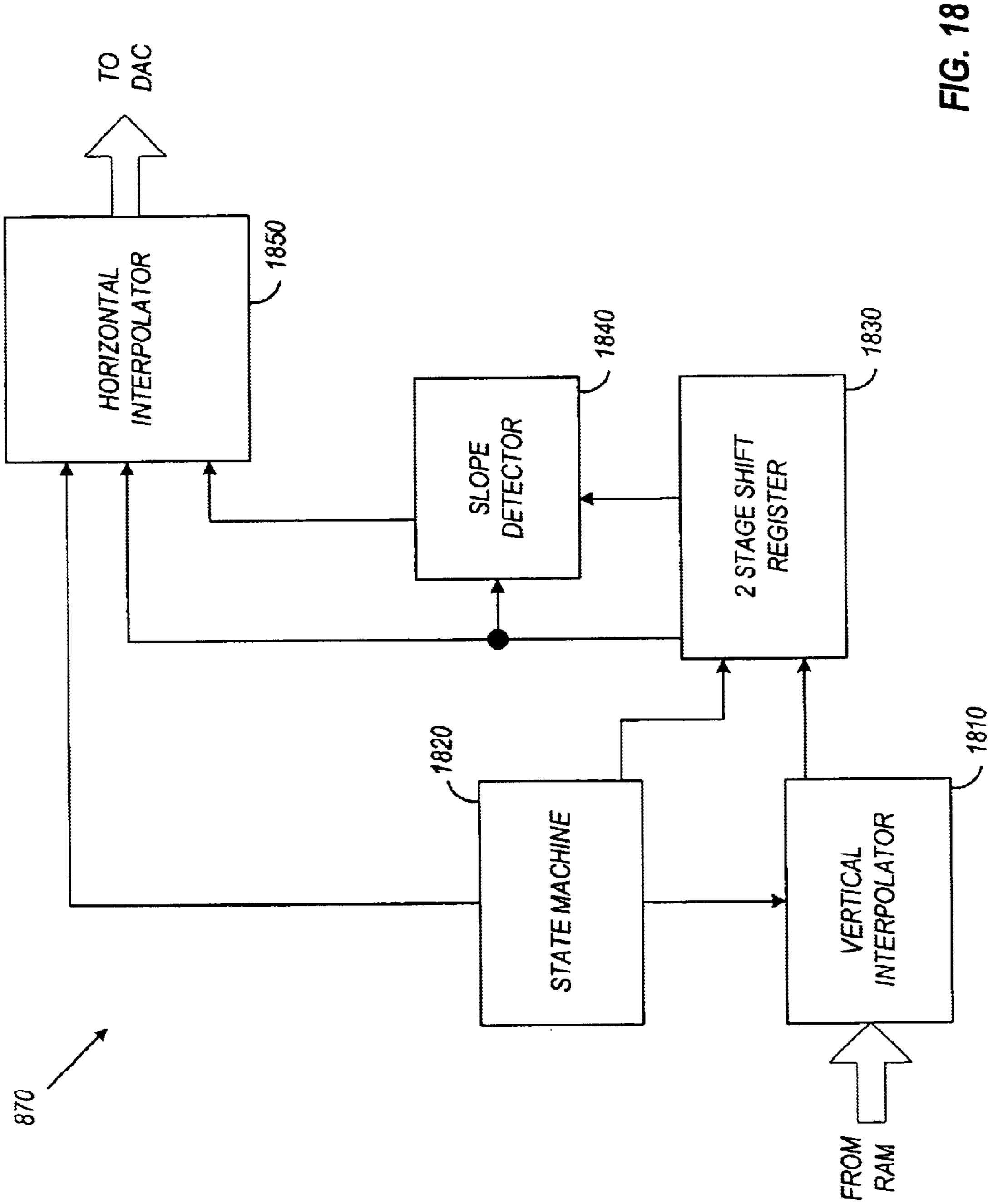
FIG. 18 is a detailed block diagram of the interpolation engine of FIG. 8, in accordance with the present invention.

Referring now to FIG. 18, a detailed block diagram of the interpolation engine 870 of FIG. 8 is shown, in accordance with the present invention. Vertical interpolator 1810 performs the vertical interpolation down the sides of the tile being scanned under control of state machine 1820. The interpolated values from the vertical edges of the tile are stored in the 2 stage shift register 1830 for subsequent use by horizontal interpolator 1850. Because the horizontal slope will change as the scan line progresses down the tile, a horizontal slope detector 1840 presents the slope of the current line between the vertically interpolated values of DC at the edges of the tile. Using the values of DC at the vertical boundary of the tile along the current scan line and the slope of the line between them, horizontal interpolator 1850 may produce the interpolated value of DC corresponding to the subtile currently traversed by the electron beam. This value is presented to DAC 880 for conversion to the correction voltage.

Figure 19:
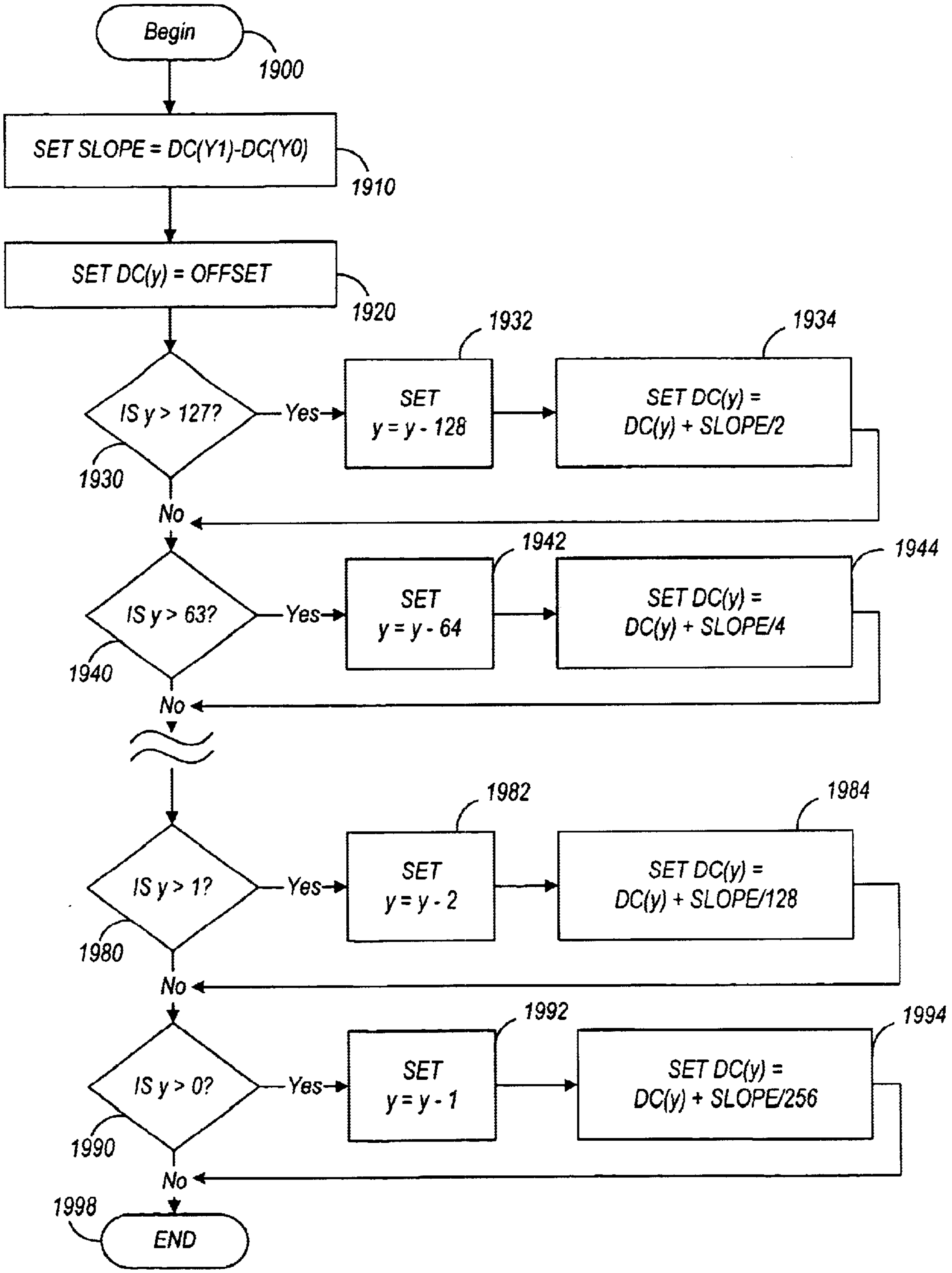
FIG. 19 is a flowchart showing the process followed in the vertical interpolator of FIG. 18, in accordance with the present invention.

Referring now to FIG. 19, a flowchart showing the process followed in the vertical interpolator 1810 of FIG. 18 is shown, in accordance with the present invention. In order to keep up with the horizontal interpolator 1850, the vertical interpolator 1810 must process an interpolation within the time taken by the beam to traverse the tile, or 32 cycles of HCLOCK. There may be up to 256 sub-tiles in the vertical direction per tile, but in the preferred embodiment conventional binary interpolation is performed, which only requires N clock cycles per 2^N steps. The flowchart of FIG. 19 describes the use of conventional binary interpolation, with its ability to use a shift register to divide by powers of 2. After beginning the process in step 1900, the variable SLOPE is calculated in step 1910. DC(y) is initially set to OFFSET in step 1920. Then, depending upon how far down y is from the upper vertex of the tile, the value of DC(y) is derived piecewise through the series of decision blocks 1930, 1940, . . . , 1980, and 1990. The value of SLOPE may be shifted and accumulated in the series of steps 1934, 1944, . . . , 1984, and 1994. As an example, let y=129. Then in step 1930 the yes branch is reached, and in step 1932 y is set to 129–128=1. Then in step 1934 DC(y) is set to OFFSET+SLOPE/2. Since y now equals 1, in step 1940 the no branch is reached, and the decision blocks are passed through until block 1990. Since y now equals 1, the yes branch of step 1990 is reached and in step 1994 DC(y) is set to (OFFSET+SLOPE/2)+SLOPE/256. In step 1992 y is set equal to 0, and the process ends in step 1998. Thus the vertical interpolation may be executed using only adders and shift registers.

Figure 20:
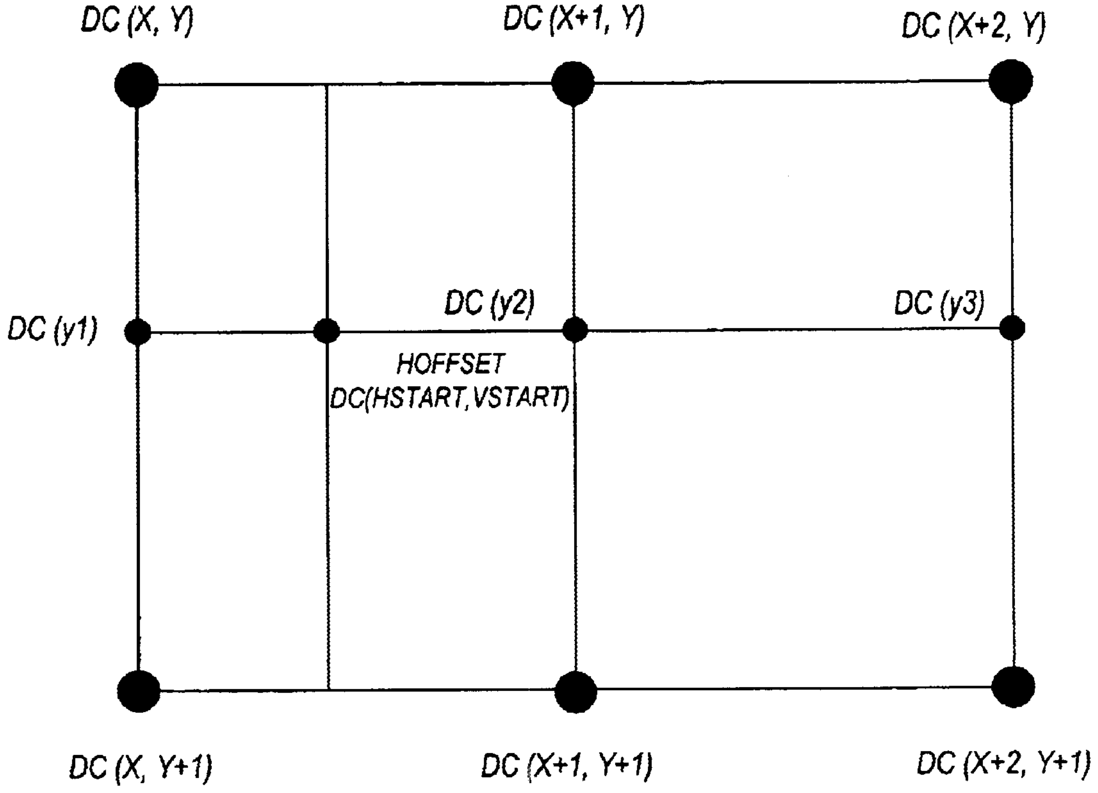
FIG. 20 is a diagram showing the determination of the initial offsets, in accordance with the present invention.

Referring now to FIG. 20, a diagram showing the determination of the initial offsets is shown, in accordance with the present invention. During the vertical retrace time 4 separate interpolations must be performed. They are the interpolations for the values of DC(y1), the initial corner of the image HOFFSET=DC(HSTART, VSTART), DC(y2), and DC(y3). The value of DC(y3) must be calculated because a full set of HCLOCK cycles may not be available. If HSTART is at the end of the first tile in a row of tiles, DC(y3) must be calculated during retrace in order that the slope between DC(y2) and DC(y3) may be calculated.

Figure 21:
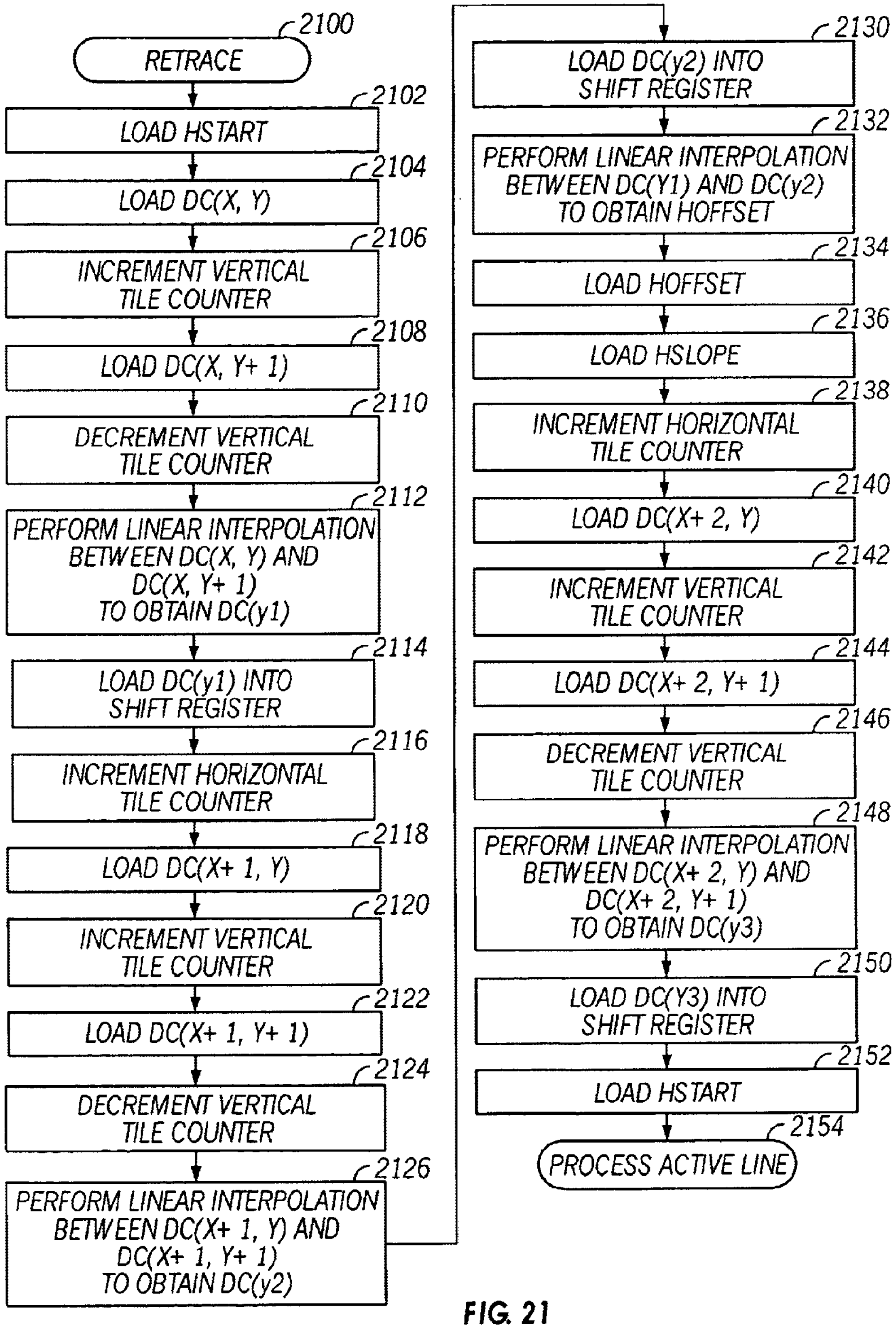
FIG. 21 is a flowchart showing the process followed in initializing the interpolation engine, in accordance with the present invention.

Referring now to FIG. 21, a flowchart showing the process followed in initializing the interpolation engine is shown, in accordance with the present invention. After a horizontal retrace begins the sequence, in step 2100, the value of HSTART is loaded into the horizontal counter 816, in step 2102. The value of DC(X,Y) is loaded from RAM 860 into interpolation engine 870 in step 2104. Then in steps 2106, 2108, and 2110 the value of DC(X, Y+1) is retrieved from RAM 860. Using these values DC(y1) is determined and stored in steps 2112 and 2114. A similar series of steps 2116 through 2130 loads DC(X+1, Y) and DC(X+1, Y+1), and then determines and stores DC(y2). Then in steps 2132 and 2134 the initial horizontally interpolated value HOFFSET is determined and stored. Finally, in step 2136 the value of HSLOPE determined in step 2132 is loaded.

In steps 2138 and 2140 the process of determining DC(y3) begins by incrementing the horizontal tile counter and retrieving DC(X+2, Y). Then in steps 2142, 2144, and 2146 the value of DC(X+2, Y+1) is retrieved. The value of DC(y3) is then determined and stored in steps 2148 and 2150. At this time the shift register 1830 contains the necessary values of DC(y1), DC(y2), and DC(y3) for horizontal interpolation of the first two horizontal tiles of the new scan line. Then in steps 2152 and 2154 the value of HSTART is again loaded and the horizontal interpolation of the new scan line commences.

Figure 22:
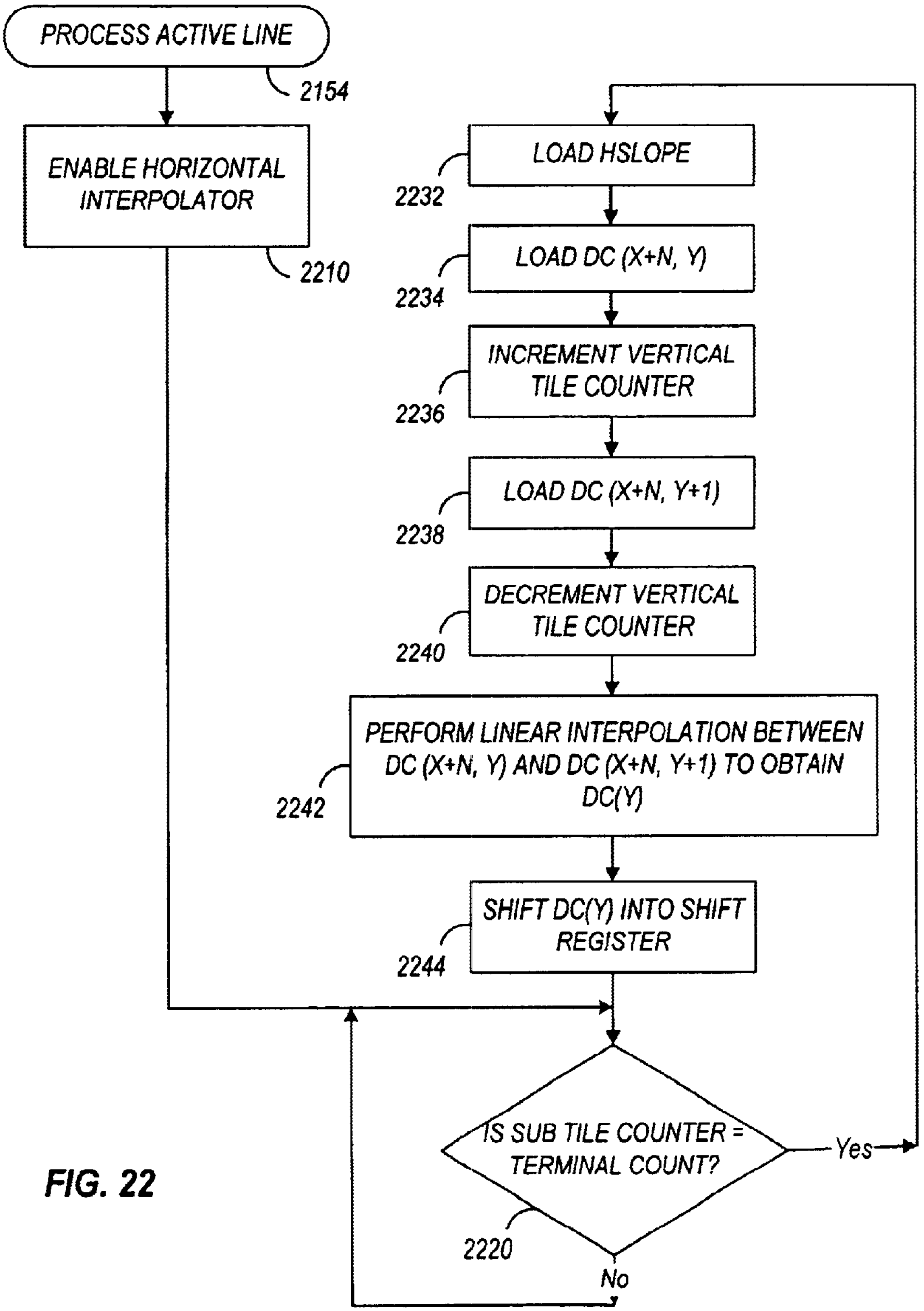
FIG. 22 is a flowchart showing the process followed in interpolation, in accordance with the present invention.

Referring now to FIG. 22, a flowchart showing the process followed in interpolation is shown, in accordance with the present invention. In step 2154 (from previous FIG. 21), the horizontal interpolation of the new scan line commences. In step 2210, the horizontal interpolator 1850 is enabled to use the vertically interpolated values stored in shift register 1830. Horizontal interpolation proceeds, and after each HCLOCK pulse the subtile counter 910 is incremented. In step 2220, if the subtile counter 910 does not contain the terminal count, then the horizontal interpolator 1850 continues. If, in step 2220, the subtile counter 910 does contain the terminal count, then the vertical interpolation for the right-hand edge of the second tile over is enabled. In step 2232, the previously determined value of HSLOPE is loaded from shift register 1830 into horizontal interpolator 1850. Then in steps 2234, 2236, 2238, and 2240 the values of DC at the vertices on the right-hand edge of the second tile over are loaded. In step 2242, these values of DC are vertically interpolated to give DC(Y), and in step 2244 DC(Y) is loaded into shift register 1830.

Figure 23:
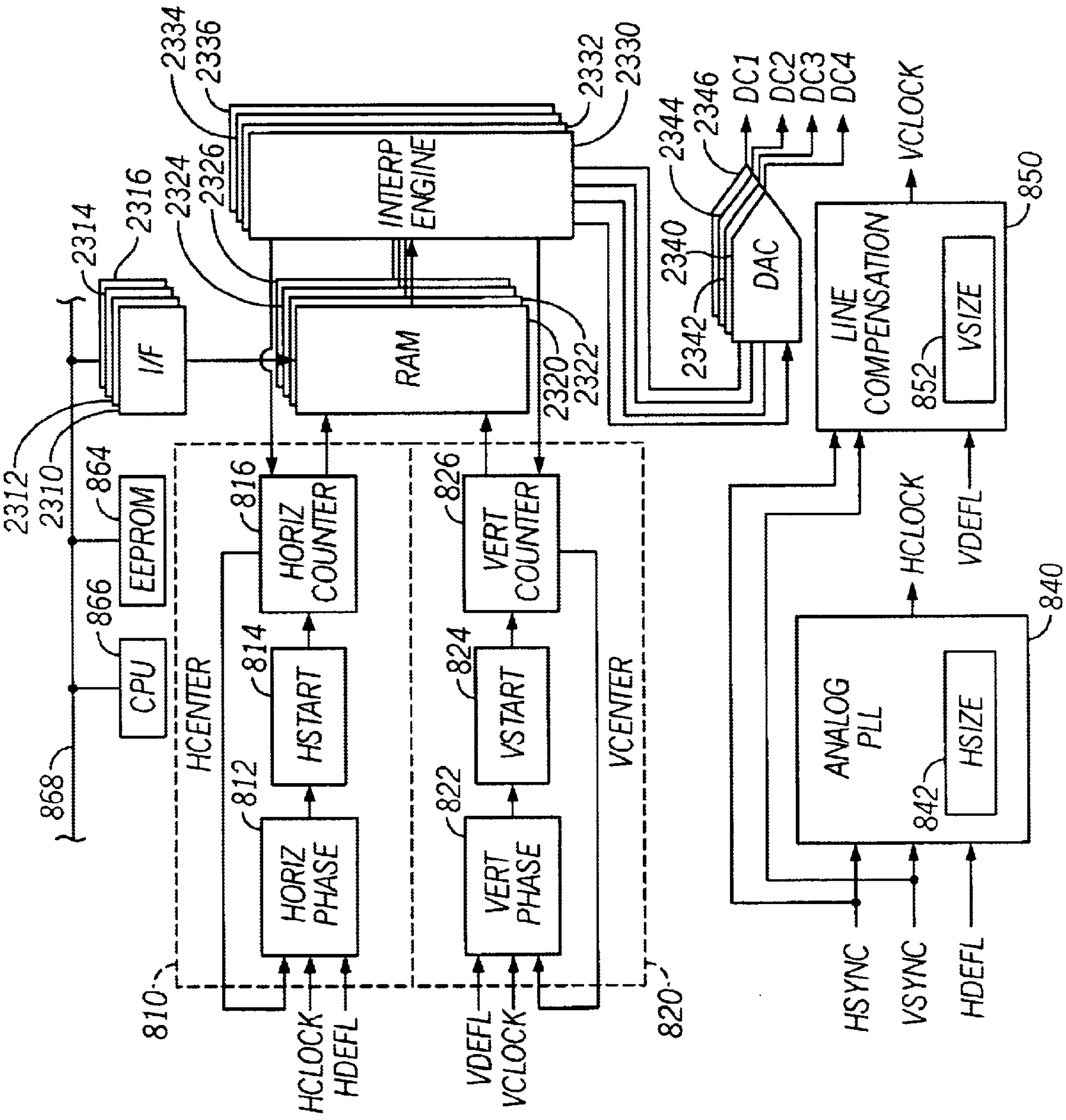
FIG. 23 is an overall block diagram of a multi-channel adaptation of the display correction circuit of FIG. 8, in accordance with the present invention.

Referring now to FIG. 23, an overall block diagram of a multi-channel adaptation of the display correction circuit of FIG. 8 is shown, in accordance with the present invention. For clarity, the display correction circuit of FIG. 8 was described with only one display characteristic being compensated. In the preferred embodiment of the present invention, four display characteristics are compensated: to brightness, hue, beam landing, and convergence. FIG. 8 shows the additional circuit elements needed to simultaneously compensate four display characteristics.

Generally the timing and control elements may be shared in a multi-channel display correction circuit. Horizontal digital PLL 810, vertical digital PLL 820, analog PLL 840, and vertical line compensation circuit 850 may be shared among the four channels. The circuits which differ are RAM 860, interface 862, interpolation engine 870, and DAC 880. Each of these elements are multiply replicated in the multi-channel display correction circuit. For example, RAM 860 of FIG. 8 is replaced by multiple RAM circuits 2320, 2322, 2324, and 2326, where each RAM circuit 2320, 2322, 2324, and 2326 contain the digital values of the correction voltages for one of the four display characteristics. Each RAM circuit 2320, 2322, 2324, and 2326 supplies information to a corresponding interpolation engine 2320, 2322, 2324, and 2326, respectively. Each interpolation engine 2320, 2322, 2324, and 2326 creates a digital representation of an interpolated correction voltage which is turned into analog form in DAC circuits 2340, 2342, 2344, and 2346, respectively. Interface circuits 2310, 2312, 2314, and 2316 allow the loading of RAM circuits 2320, 2322, 2324, and 2326 from initial values stored in EEPROM 864.

In the preferred embodiment, the circuits as shown in FIG. 23, with the exception of CPU 866 and EEPROM 864, comprise DC ASIC 510 of FIG. 5. The integration of the circuits in this manner yields a cost-effective display correction circuit of general applicability.

Figure 24:
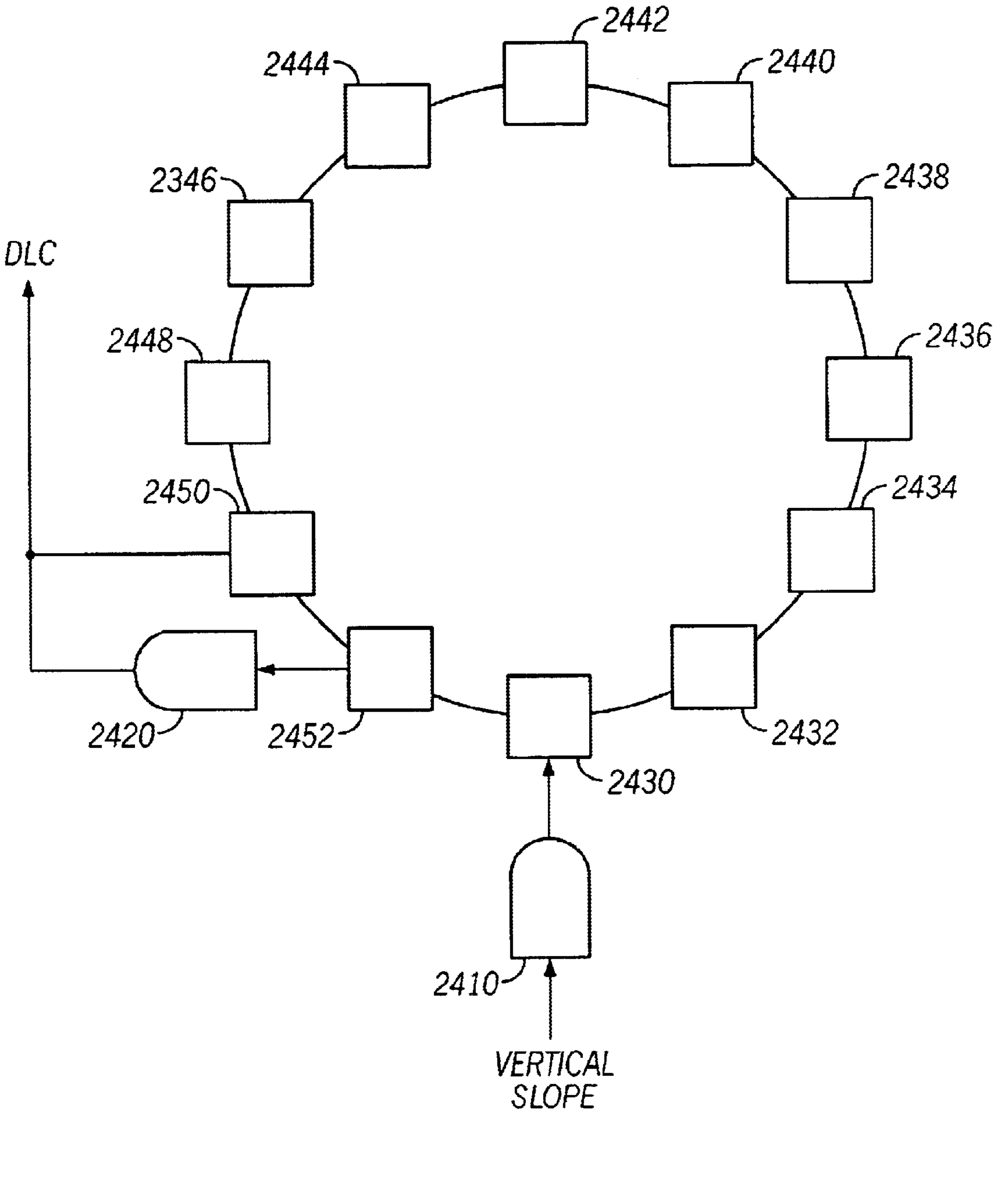
FIG. 24 is a block diagram of the flywheel buffer alternate embodiment of the interpolation engine of FIG. 8.

Referring now to FIG. 24, a block diagram of the flywheel buffer alternate embodiment of the interpolation engine of FIG. 8 is shown. This alternate embodiment replaces interpolation engine 870 and simplifies the multiple RAM 860 accessing discussed in connection with FIGS. 21 and 22. FIG. 24 shows vertical interpolator 2410 and horizontal interpolator 2420, which generally correspond to vertical interpolator 1810 and horizontal interpolator 1850 of FIG. 18. In the flywheel buffer embodiment, 12 buffer sets 2430 through 2452 are connected as a ring shift register, where the data shifts in a counter-clockwise direction. The 12 buffer sets 2430 through 2452 correspond to the 11 horizontal tiles. Horizontal interpolator 2420 uses the information contained in adjacent buffer sets 2450 and 2452, corresponding to vertically interpolated data on the two vertical edges of the current tile. Vertical interpolator 2410 constantly interpolates for the subsequent use of the horizontal interpolator 2420.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for dynamically correcting display characteristics of an image on a display, comprising:

a correction generator for generating correction signals for compensating for non-uniformities in display characteristics for said image based on said display; and an image synchronizer for matching said correction signals to said image by creating a one-to-one correspondence between a plurality of logical positions of the displayed image and the correction signal values corresponding to a plurality of physical positions of the display, wherein said image synchronizer includes a horizontal size synchronizer for matching said correction signals to horizontal size of said image;

a vertical size synchronizer for matching said correction signals to vertical size of said image;

a horizontal position synchronizer for matching said correction signals to horizontal position of said image, wherein said horizontal position synchronizer includes a first digital phase-locked loop; and a vertical position synchronizer for matching said correction signals to vertical position of said image.

2. The system of claim 1 wherein said horizontal size synchronizer is an analog phase-locked loop.

3. The system of claim 2 wherein said analog phase-locked loop uses a frequency multiplier.

4. The system of claim 3 wherein said frequency multiplier uses a value computed from a count of pulses of a first digital clock during a first analog pulse.

5. The system of claim 1 wherein said vertical size synchronizer is a line compensation circuit.

6. The system of claim 5 wherein said line compensation circuit varies the number of sub-lines in a frame.

7. The system of claim 6 wherein said number of sub-lines is proportional to a count of vertical sub-tiles during a second analog pulse.

8. The system of claim 1 wherein said first digital phase-locked loop compares a first analog pulse to a first digital pulse derived from a count of a first digital clock.

9. The system of claim 8 wherein said first digital phase-locked loop adjusts an initial count value of said first digital clock to lock onto said first analog pulse.

10. The system of claim 1 wherein said vertical position synchronizer is a second digital phase-locked loop.

11. The system of claim 10 wherein said second digital phase-locked loop compares a second analog pulse to a second digital pulse derived from a count of a second digital clock.

12. The system of claim 11 wherein said second digital phase-locked loop adjusts an initial count value of said second digital clock to lock onto said second analog pulse.

13. A system for dynamically correcting display characteristics of an image on a display, comprising:

a correction generator for generating correction signals for compensating for non-uniformities in display characteristics for said image based on said display, wherein said correction generator uses stored correction signal values sampled on a tiled grid; and an image synchronizer for matching said correction signals to said image by creating a one-to-one correspondence between a plurality of logical positions of the displayed image and the correction signal values corresponding to a plurality of physical positions of the display, wherein said image synchronizer includes a horizontal size synchronizer for matching said correction signals to horizontal size of said image;

a vertical size synchronizer for matching said correction signals to vertical size of said image;

a horizontal position synchronizer for matching said correction signals to horizontal position of said image, wherein said horizontal position synchronizer includes a horizontal subtile counter for counting a plurality of sub-tiles within each tile of the tiled grid; and a vertical position synchronizer for matching said correction signals to vertical position of said image, wherein said vertical position synchronizer includes a vertical subtile counter for counting a plurality of sub-tiles within each tile of the tiled grid.

14. The system of claim 13 wherein said stored correction signal values are stored as digital values.

15. The system of claim 14 wherein said stored correction signal values are linearly interpolated.

16. The system of claim 15 wherein said stored correction signal values are linearly interpolated on a subtiled grid.

17. The system of claim 16 wherein said correction generator is clocked by a clock signal phase locked to said subtiled grid.

18. The system of claim 14 wherein said correction signal values are vertically interpolated by binary interpolation.

19. The system of claim 14 wherein said correction signal values are horizontally interpolated.

20. The system of claim 14 wherein said correction signal values are interpolated under the control of a state machine.

21. A method of dynamically correcting display characteristics of an image on a display, comprising the steps of:

generating correction signals for compensating for non-uniformities in display characteristics for said image based on said display; and matching said correction signals to said image, wherein said step of matching said correction signals to said image includes matching said correction signals to horizontal size of said image;

matching said correction signals to vertical size of said image;

matching said correction signals to horizontal position of said image; and matching said correction signals to vertical position of said image in order to create a one-to-one correspondence between a plurality of logical positions of the displayed image and the correction signal values corresponding to a plurality of physical positions of the display, wherein at least one of said matching said correction signals steps includes the use of a first digital phase-locked loop circuit.

22. The method of claim 21 wherein said step of matching said correction signals to said horizontal size is performed by an analog phase-locked loop.

23. The method of claim 22 wherein said analog phase-locked loop uses a frequency multiplier.

24. The method of claim 23 wherein said frequency multiplier uses a value computed from a count of pulses of a first digital clock during a first analog pulse.

25. The method of claim 21 wherein said step of matching said correction signals to vertical size is performed by a line compensation circuit.

26. The method of claim 26 wherein said line compensation circuit varies the number of sub-lines in a frame.

27. The method of claim 26 wherein said number of sub-lines is proportional to a count of vertical sub-tiles during a second analog pulse.

28. The method of claim 21 wherein said step of matching said correction signals to said horizontal position is performed by a second digital phase-locked loop.

29. The method of claim 28 wherein said second digital phase-locked loop compares a first analog pulse to a first digital pulse derived from a count of a first digital clock.

30. The method of claim 29 wherein said second digital phase-locked loop adjusts an initial count value of said first digital clock to lock onto said first analog pulse.

31. The method of claim 21 wherein said first digital phase-locked loop compares a second analog pulse to a second digital pulse derived from a count of a second digital clock.

32. The method of claim 31 wherein said first digital phase-locked loop adjusts an initial count value of said second digital clock to lock onto said second analog pulse.

33. A method of dynamically correcting display characteristics of an image on a display, comprising the steps of:

generating correction signals for compensating for non-uniformities in display characteristics for said image based on said display, wherein said step of generating correction signals uses stored correction signal values sampled on a tiled grid; and matching said correction signals to said image in order to create a one-to-one correspondence between a plurality of logical positions of the displayed image and the correction signal values corresponding to a plurality of physical positions of the display, wherein said step of matching said correction signals to said image includes matching said correction signals to horizontal size of said image;

matching said correction signals to vertical size of said image;

matching said correction signals to horizontal position of said image, wherein said step of matching includes counting a plurality of sub-tiles within each tile of the tiled grid to match said correction signals to said horizontal position; and matching said correction signals to vertical position of said image, wherein said step of matching includes counting a plurality of sub-tiles within each tile of the tiled grid to match said correction signals to said vertical position.

34. The method of claim 33 wherein said stored correction signal valves are stored as digital values.

35. The method of claim 34 wherein said stored correction signal values are linearly interpolated.

36. The method of claim 34 wherein said stored correction signal value are linearly interpolated on a subtiled grid.

37. The method of claim 35 wherein said correction generator is clocked by a clock signal phase locked to said subtiled grid.

38. The method of claim 21 wherein said step of generating correction signals includes vertical interpolation by binary interpolation.

39. The method of claim 21 wherein said step of generating correction signals includes horizontal interpolation.

40. A method of dynamically correcting display characteristics of an image on a display, comprising the steps of:

generating correction signals for compensating for non-uniformities in display characteristics for said image based on said display, wherein said step of generating correction signals includes generating correction signals under the control of a state machine; and matching said correction signals to said image, wherein said step of matching said correction signals to said image includes matching said correction signals to horizontal size of said image;

matching said correction signals to vertical size of said image;

matching said correction signals to horizontal position of said image; and matching said correction signals to vertical position of said image in order to create a one-to-one correspondence between a plurality of logical positions of the displayed image and the correction signal values corresponding to a plurality of physical positions of the display, wherein at least one digital phase-locked loop circuit is used to match said correction signals to said image.

41. A system for dynamically correcting display characteristics of an image comprising:

a ring shift register with a plurality of buffer sets;

a horizontal interpolator coupled to said buffer sets of said ring buffer; and a vertical interpolator coupled to said buffer sets of said ring buffer.

42. An interpolation engine, comprising:

a ring shift register with a plurality of buffer sets;

a horizontal interpolator coupled with said buffer sets; and a vertical interpolator coupled with said buffer sets.

43. The system of claim 1 further comprising an interpolation engine that interpolates signal values, first interpolating along a first direction to obtain interpolated values that are then used to interpolate along a second direction.

44. The system of claim 13 further comprising: an interpolation engine that interpolates signal values, first interpolating along two opposite edges of a tile of the grid to obtain a first set of interpolated values that are later used to interpolate to obtain a second set of at least one interpolated value that is used in an interior region of the tile.

45. The method of claim 21 further comprising: an interpolation step that interpolates signal values, interpolating along a first direction to obtain interpolated values that are then used to interpolate along a second direction.

46. The method of claim 33 further comprising: an interpolation step that interpolates signal values, first interpolating along two opposite edges of a tile of the grid to obtain a first set of interpolated values that are later used to interpolate to obtain a second set of at least one interpolated value that is used in an interior region of the tile.

47. The system of claim 43 wherein a value obtained by interpolating along the second direction derived from at least two interpolated values along the first direction.

48. The system of claim 43 wherein a value of the second set is derived from least two interpolated values of the second set.

49. The method of claim 45 wherein a value obtained by interpolating along the second direction is derived from at least two interpolated values along the first direction.

50. The system of claim 46 wherein a value of the second direction is derived from at least two interpolated values along the first set.

51. A system for dynamically correcting display characteristics of an image on a display, comprising:

a correction generator for generating correction signals for compensating for non-uniformities in display characteristics for said image based on said display; and an image synchronizer for matching said correction signals to said image, wherein said image synchronizer includes a horizontal size synchronizer for matching said correction signals to horizontal size of said image;

a vertical size synchronizer for matching said correction signals to vertical size of said image;

a horizontal position synchronizer for matching said correction signals to horizontal position of said image, wherein said horizontal position synchronizer includes a first digital phase-locked loop; and a vertical position synchronizer for matching said correction signals to vertical position of said image, wherein said vertical position synchronizer includes a second digital phase-locked loop.

52. The system of 51 wherein said horizontal size synchronizer is an analog phase-locked loop that uses a frequency multiplier.

53. The system of claim 52 wherein said frequency multiplier uses a value computed from a count of pulses of a first digital clock during a first analog pulse.

54. The system of claim 51 wherein said vertical size synchronizer is a line compensation circuit that varies the number of sub-lines in a frame.

55. The system of claim 54 wherein said number of sub-lines is proportional to a count of vertical sub-tiles during a second analog pulse.

56. The system of claim 51 wherein said first digital phase-locked loop compares a first analog pulse to a first digital pulse derived from a count of a first digital clock.

57. The system of claim 56 wherein said first digital phase-locked loop adjusts an initial count value of said first digital clock to lock onto said first analog pulse.

58. The system of claim 51 wherein said second digital phase-locked loop compares a second analog pulse to a second digital pulse derived from a count of a second digital clock.

59. The system of claim 58 wherein said second digital phase-locked loop adjusts an initial count value of said second digital clock to lock onto said second analog pulse.

60. The system of claim 51 wherein said correction generator uses store correction signal values sampled on a tiled grid.

61. The system of claim 60 wherein said stored correction signal values are linearly interpolated on a subtiled grid.

62. The system of claim 61 wherein said correction generator is clocked by a clock signal phase locked to said subtiled grid.

63. The system of claim 60 wherein said correction signal values are vertically interpolated by binary interpolation.

64. The system of claim 60 wherein said correction signal values are horizontally interpolated.

65. The system of claim 60 wherein said correction signal values are interpolated under the control of a state machine.

66. A method of dynamically correcting display characteristics of an image on a display, comprising the steps of:

generating correction signals for compensating for non-uniformities in display characteristics for said image based on said display; and matching said correction signals to said image, wherein said step of matching said correction signals to said image includes matching said correction signals to horizontal size of said image;

matching said correction signals to vertical size of said image;

matching said correction signals to horizontal position of said image, wherein said step of matching said correction signals to said horizontal position includes the use of a first digital phase-locked loop circuit; and matching said correction signals to vertical position of said image, wherein said step of matching said correction signals to said vertical position includes the use of second digital phase-locked loop circuit.

67. The method of claim 66 wherein said step of matching said correction signals to said horizontal size is performed by an analog phase-locked loop circuit that uses a frequency multiplier.

68. The method of claim 67 wherein said frequency multiplier uses a value computed from a count of pulses of a first digital clock during a first analog pulse.

69. The method of claim 66 wherein said step of matching said correction signals to vertical size is performed by a line compensation circuit that varies the number of sub-lines in a frame.

70. The method of claim 69 wherein said number of sub-lines is proportional to a count of vertical sub-tiles during a second analog pulse.

71. The method of claim 66 wherein said first digital phase-locked loop compares a first analog pulse to a first digital pulse derived from a count of a first digital clock.

72. The method of claim 71 wherein said first digital phase-locked loop adjusts an initial count value of said first digital clock to lock onto said first analog pulse.

73. The method of claim 66 wherein said second digital phase-locked loop compares a second analog pulse to a second digital pulse derived from a count of a second digital clock.

74. The method of claim 73 wherein said second digital phase-locked loop adjusts an initial count value of said second digital clock to lock onto said second analog pulse.

75. The method of claim 66 wherein said step of generating correction signals uses stored correction signal values sampled on a tiled grid.

76. The method of claim 75 wherein said stored correction signal values are linearly interpolated.

77. The method of claim 75 wherein said stored correction signal values are linearly interpolated on a subtiled grid.

78. The method of claim 77 wherein said correction generator is clocked by a clock signal phase locked to said subtiled grid.

79. The method of claim 66 wherein said step of generating correction signals includes vertical interpolation by binary interpolation.

80. The method of claim 66 wherein said step of generating correction signals includes horizontal interpolation.

81. A system for dynamically correcting at least one display characteristic of an image on a display screen, comprising:

means for obtaining initial correction values for the at least one display characteristic;

means for generating correction signals for the at least one display characteristic based on the initial correction values; and means for synchronizing the correction signals with the control signals of the image on the display screen in order to create a fixed one-to-one correspondence between a plurality of logical positions of the displayed image and the correction signal values corresponding to a plurality of physical positions of the display, wherein said means for synchronizing the correction signal with the control signals includes means for dividing logically said display screen into a plurality of sub-tiles within a tiled grid.

82. The system of claim 81 wherein the means for obtaining initial correction values of the at least one display characteristic comprises means for reading the initial correction values of the at least one display characteristic from a memory.

83. The system of claim 82 further comprising means for counting said sub-tiles within each tile in said tiled grid.

84. The system of claim 83 wherein the means for generating correction signals includes means for interpolating at least one initial correction value corresponding to at least one vertex of at tile.

* * * * *